United States Patent [19]
Yahav et al.

[11] Patent Number: 5,525,781
[45] Date of Patent: Jun. 11, 1996

[54] COOKING DEVICE HAVING STIRRING DEVICE INCLUDING PIVOTABLY MOUNTED UTENSIL ENGAGEMENT ELEMENT

[75] Inventors: Shimon Yahav, Rehovot; Yair Daar, Moshav Galia, both of Israel

[73] Assignee: Lancet S.A., Panama, Panama

[21] Appl. No.: 229,812

[22] Filed: Jun. 20, 1994

Related U.S. Application Data

[63] Continuation of Ser. No. 614,308, Nov. 15, 1990, Pat. No. 5,412,171.

[30] Foreign Application Priority Data

Apr. 24, 1990 [IL] Israel ........................................ 94178
Sep. 25, 1990 [IL] Israel ........................................ 95793

[51] Int. Cl.$^6$ .................................................... H05B 6/12
[52] U.S. Cl. .............................. 219/620; 366/221; 99/348
[58] Field of Search .................................... 219/620, 621, 219/622, 726; 99/348, 451, DIG. 14; 366/221, 287, 288, 332, 333

[56] References Cited

U.S. PATENT DOCUMENTS

| | | |
|---|---|---|
| 774,350 | 11/1904 | Castle . |
| 1,491,991 | 4/1924 | Lacy . |
| 1,642,531 | 9/1927 | Barnard . |
| 1,674,692 | 6/1928 | McHugh . |
| 1,786,877 | 12/1930 | Thompson . |
| 1,790,115 | 1/1931 | Sells . |
| 1,901,314 | 3/1933 | McArdle . |
| 2,039,277 | 5/1936 | Baehr . |
| 2,345,063 | 3/1944 | Nauta ................................... 366/287 |
| 3,109,633 | 11/1963 | Nauta ................................... 366/287 |
| 3,307,009 | 1/1967 | Schroeder . |
| 3,407,872 | 9/1968 | Crane . |
| 3,635,147 | 1/1972 | Lee . |
| 3,659,826 | 5/1972 | Nauta ................................... 366/287 |
| 3,742,679 | 6/1973 | Harnden . |
| 3,761,668 | 9/1973 | Harnden . |
| 3,770,928 | 11/1973 | Kornrumf . |
| 3,781,505 | 12/1973 | Steigerwald . |
| 3,786,222 | 1/1974 | Harnden . |
| 3,814,888 | 6/1974 | Bowers . |
| 3,861,656 | 1/1975 | Schmitt . |
| 3,979,572 | 9/1976 | Ito . |
| 4,023,780 | 5/1977 | Egid ........................................ 259/102 |
| 4,029,926 | 6/1977 | Austin . |
| 4,038,518 | 7/1977 | Morton . |
| 4,073,225 | 2/1978 | Lang-Ree . |
| 4,092,509 | 5/1978 | Mitchell .............................. 219/10.75 |
| 4,115,677 | 9/1978 | Yamamura . |
| 4,234,605 | 11/1980 | Takeaghi . |
| 4,280,038 | 7/1981 | Havas . |
| 4,296,295 | 10/1981 | Kiuchi . |
| 4,348,571 | 9/1982 | Dills . |
| 4,417,506 | 11/1983 | Herbst . |
| 4,426,564 | 1/1984 | Steigerwald . |
| 4,453,067 | 6/1984 | Karklys . |
| 4,467,162 | 8/1984 | Kondo . |
| 4,492,652 | 12/1988 | Seguy . |
| 4,503,502 | 3/1985 | Chopin . |
| 4,504,152 | 3/1985 | Moller . |
| 4,511,781 | 4/1985 | Tucker . |
| 4,549,056 | 10/1985 | Okatsuka . |
| 4,596,913 | 6/1986 | Takechi . |
| 4,617,441 | 10/1986 | Koide . |
| 4,629,843 | 1/1986 | Kato . |

FOREIGN PATENT DOCUMENTS

| | | |
|---|---|---|
| 2614766 | 11/1988 | France . |
| 3723485 | 1/1989 | Germany . |
| 2196238 | 4/1988 | United Kingdom . |
| 8701021 | 2/1987 | WIPO . |

*Primary Examiner*—Philip H. Leung
*Attorney, Agent, or Firm*—Ladas & Parry

[57] ABSTRACT

Stirring apparatus including a stirrer having an mounting the stirrer at the attachment end and driving the stirrer in motion in operative association with a utensil defining a utensil surface and a utensil contacting member mounted onto the termination end of the stirrer and being orientatable with respect thereto so as to correspond to the configuration of the utensil surface in engagement therewith.

8 Claims, 20 Drawing Sheets

U.S. PATENT DOCUMENTS

| | | |
|---|---|---|
| 4,649,810 | 3/1987 | Wong . |
| 4,667,074 | 5/1987 | Kubo . |
| 4,692,610 | 9/1987 | Weiss . |
| 4,733,607 | 3/1988 | Star ............................................ 99/348 |
| 4,736,082 | 4/1988 | Matsuo . |
| 4,749,836 | 6/1988 | Matsuo . |
| 4,763,567 | 8/1988 | Dalquist . |
| 4,817,510 | 4/1989 | Kowalics . |
| 4,820,054 | 4/1989 | Wong . |
| 4,820,891 | 4/1989 | Tanaka . |
| 4,885,447 | 1/1989 | Sanchez-Gonzalez . |
| 5,050,490 | 9/1991 | Yahav ........................................ 99/348 |
| 5,070,222 | 12/1991 | Yahvu . |
| 5,095,812 | 3/1992 | Yahav ........................................ 99/348 |

FIG.13A
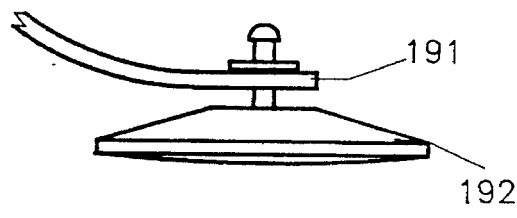
FIG.13B
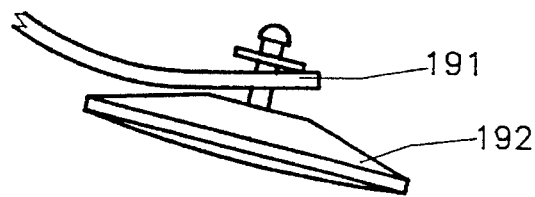
FIG.13C
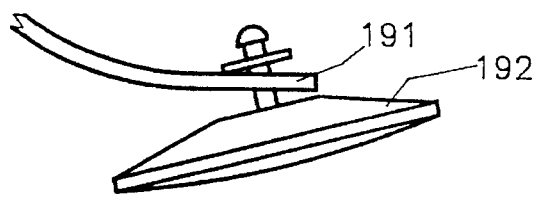
FIG.14
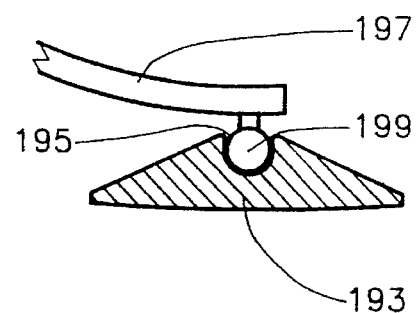
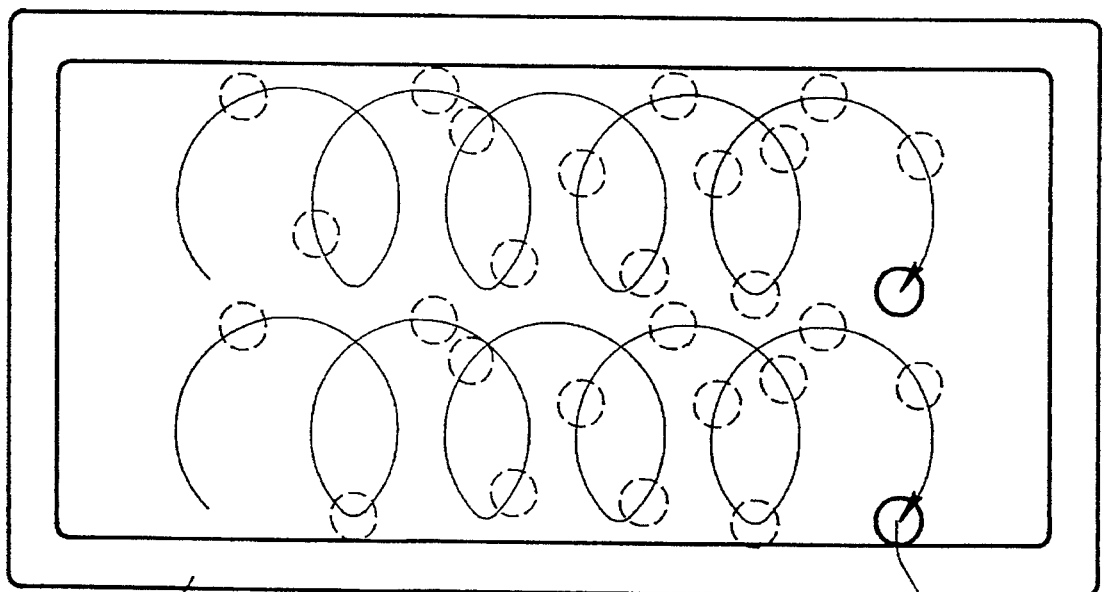
FIG.15

COOKING DEVICE HAVING STIRRING DEVICE INCLUDING PIVOTABLY MOUNTED UTENSIL ENGAGEMENT ELEMENT

This is a continuation of application Ser. No. 07/614,308, filed on Nov. 15, 1990, U.S. Pat. No. 5,412,171.

FIELD OF THE INVENTION

The present invention relates to domestic food cooking apparatus and systems generally.

BACKGROUND OF THE INVENTION

Various types of domestic food cooking apparatus are known in the art. In the domestic cooking art, there are known various automated cooking devices including mechanical mixing apparatus.

The following patents are considered to be representative of the prior art:

U.S. Pat. No. 3,635,147 describes a combination cooking-stirring vessel in which two sets of blades are rotated continuously by means of a motor drive applied to the rim of a generally round bowl, as food is heated. One set of blades rotates along the bottom of the bowl except at the center bottom region.

U.S. Pat. No. 1,790,115 describes apparatus for treating food products comprising a plurality of rotating blades and a curved bottom surface.

U.S. Pat. No. 4,693,610 describes an electrical household appliance for culinary purposes including apparatus for stirring and heating the contents of a bowl. This apparatus provides continuous rotation of a stirrer adjacent the bottom of a flat bottomed bowl.

U.S. Pat. No. 4,649,810 describes microcomputer-controlled, integrated cooking apparatus for automatically preparing culinary dishes. The apparatus includes a memory for storing one or more recipe programs. The recipe program specifies schedules for dispensing the ingredients from a compartmentalized carousel into a flat bottomed cooking vessel, for heating the vessel and for continuously stirring the contents of the vessel.

U.S. Pat. No. 1,491,991 describes a beverage mixer and heater which provides stirring of the contents of a container having an electric heating element incorporated in its construction.

In an industrial environment, which is distinct from the domestic food cooking field discussed above, there have been proposed various devices which provide heating or cooling of food products. For example, U.S. Pat. No. 4,073,225 describes, on an industrial scale, a continuously operable meatball cooker employing a trough which is engaged by helical vanes. U.S. Pat. No. 3,407,872 employs a trough-like tank having a reciprocating paddle for circulating a heating or cooling fluid.

Italian patent 567138, granted Oct. 1, 1957, describes a mechanical agitator including first and second series connected mutually angled shafts, which are driven by a motor. The second shaft includes a fixed termination end which engages the inner surface of a container.

U.S. Pat. No. 4,629,843 describes induction cooking apparatus having a ferrite coil support and includes monitoring and control apparatus for preventing heating of the ferrite coil support above its Curie temperature.

U.S. Pat. No. 4,467,162 describes an arrangement for an induction heating process employing a shielding plate member of non-magnetizable metallic material disposed in a space between a heating coil and a bottom plate.

U.S. Pat. No. 3,761,668 describes a cooking system wherein small electrical appliances are powered by an induction cooking device.

U.S. Pat. No. 4,817,510 illustrates cooking apparatus wherein the temperature of cooked food is automatically controlled and varied during a cooking cycle.

U.S. Pat. No. 4,885,447 describes a system for induction heating of the electric plates of a cooker and employs an inverter bridge of MOS technology to provide a pulsating current.

U.S. Pat. No. 4,736,082 describes electromagnetic induction heating apparatus capable of preventing undesirable states of cooking utensils or vessels.

U.S. Pat. No. 4,549,056 describes electromagnetic induction heating apparatus capable of heating nonmagnetic cooking vessels and employs an AC field having a frequency of at least 50 KHz and preferably about 100 KHz, for heating non-magnetic materials such as aluminum. For magnetic materials, such as iron, a separate switching circuit and a separate coil provide an AC field having a significantly lower operating frequency. U.S. Pat. No. 4,749,836 describes electromagnetic induction cooking apparatus capable of providing a substantially constant input power, which includes features similar to those described above in connection with the apparatus of U.S. Pat. No. 4,549,056.

U.S. Pat. No. 4,792,652 describes an electric induction cooking appliance with reduced harmonic emission which employs a plurality of coils wound in opposite senses. U.S. Pat. No. 4,453,067 describes an induction heating coil having non-uniformly spaced turns.

U.S. Pat. No. 3,814,888 describes a solid state induction cooking appliance operating at ultrasonic frequencies.

U.S. Pat. Nos. 3,814,888; 4,296,295; 4,617,441; 4,667,074; 4,426,564; 3,761,668 and 3,742,179 all show induction heating systems for cooking and some show temperature measurement apparatus operative therewith.

SUMMARY OF THE INVENTION

The present invention seeks to provide improved domestic food cooking apparatus as well as integrated, modular versatile domestic cooking systems for quick cooking of most foods in the kitchen. The term "cooking" will be used throughout to refer generally to the application of heat to foodstuffs in a domestic context and includes, inter alia, heating liquids of various viscosities, and dry roasting of bulk foodstuffs, such as nuts, beans and seeds.

It is a principal object of the present invention to provide a system capable of carrying out all normal domestic cooking functions within a small area. These functions include, for example, cooking of liquids, such as soups, stews and the like, frying, roasting, baking, defrosting and boiling of water.

The cooking center of the present invention may comprise a compact unit which can operate interchangeably with a wide variety of cooking utensils.

According to a preferred embodiment of the invention, the cooking center is characterized in that it provides fast and uniform cooking at high energy efficiency. The cooking center of the present invention is easy to operate and may provide controlled cooking and even stirring of foods.

There is thus provided in accordance with an embodiment of the present invention a domestic cooking system useful for heating utensils having a bottom surface formed of a metal having low electrical resistance, the system including electromagnetic induction apparatus including an induction coil having more than 80 turns and preferably more than 100 turns.

There is also provided in accordance with a preferred embodiment of the present invention a domestic cooking system useful for heating a utensil having a bottom surface formed of a metal having low electrical resistance, the system comprising electromagnetic induction apparatus including an induction coil receiving an AC electrical input at a frequency less than 50 KHz and preferably less than 30 KHz.

There is further provided in accordance with a preferred embodiment of the present invention a domestic cooking system useful for heating a utensil having a bottom surface formed of a metal having low electrical resistance, the system comprising electromagnetic induction apparatus including an induction coil having a voltage of less than 4000 Volts thereacross during operation.

There is additionally provided in accordance with a preferred embodiment of the present invention a domestic cooking system useful for heating utensils having a bottom surface formed of a metal having low electrical resistance and comprising electromagnetic induction apparatus including induction producing apparatus producing inductance of at least 1000 microHenry and preferably in excess of 2000 microHenry.

There is also provided in accordance with a preferred embodiment of the present invention a domestic cooking system including a base defining at least one cooking location, electromagnetic induction apparatus for heating a food at the cooking location and apparatus for automatic stirring of the food at the cooking location.

There is additionally provided in accordance with a preferred embodiment of the present invention a domestic cooking system comprising electromagnetic induction apparatus for heating a food at the cooking location by providing magnetic flux at the cooking location and apparatus for providing electric field shielding at least between the electromagnetic induction apparatus and the cooking location. Preferably the apparatus for providing electric field shielding is operative to surround the electromagnetic induction apparatus and to provide electromagnetic shielding of the electromagnetic induction apparatus, while permitting the substantially unimpeded passage of magnetic flux across the electromagnetic shielding apparatus to the cooking location.

There is additionally provided in accordance with a preferred embodiment of the present invention a domestic cooking system useful for heating utensils having a bottom surface formed of a metal having low electrical resistance, the system including electromagnetic induction apparatus for heating a food at a cooking location, the electromagnetic induction apparatus operating in a non-resonant mode. Preferably, the electromagnetic induction apparatus comprises an induction coil and high frequency switching apparatus and apparatus for providing negative feedback to the high frequency switching apparatus.

There is further provided in accordance with an embodiment of the present invention a domestic cooking system useful for heating utensils of a first type, having a bottom surface having high electrical resistance, and of a second type, having a bottom surface having low electrical resistance, the system including:

electromagnetic induction apparatus including an induction coil;

automatic control apparatus for governing the operation of the electromagnetic induction apparatus and being operable in first and second modes, the first mode being suitable for heating utensils of the first type and employing a first number of turns of the induction coil and the second mode being suitable for heating utensils of the second type and employing a second number of turns of the induction coil, larger than the first number of turns; and apparatus for supplying an AC electrical power input to the induction coil generally at the same frequency during operation in both the first and second modes.

There is also provided in accordance with a preferred embodiment of the invention a domestic cooking system comprising:

a base defining at least one cooking location and comprising electromagnetic induction apparatus including:

an induction coil disposed generally in at least one plane and operative to generate electromagnetic flux; and at least one magnetic field conductor disposed in a plane extending generally non-parallel to the at least one plane so as to direct electromagnetic flux generated by the induction coil to the at least one cooking location. Preferably the magnetic field conductor comprises a ferromagnetic foil which is disposed generally perpendicular to the at least one plane and has a ratio of width in the direction generally perpendicular to the at least one plane relative to thickness of at least 10 and more preferably of at least 200. Preferably the ferromagnetic foil comprises a plurality of groups of generally radially extending foils, individual ones of said plurality of groups being electrically insulated from each other.

Alternatively the magnetic field conductor comprises a ferromagnetic wire wound in a generally toroidal arrangement to define a plurality of loops, each of which is disposed in a plane generally perpendicular to the at least one plane.

Preferably, the magnetic field conductor includes portions which extend generally radially, comprises amorphous metal and has a thickness of less than 0.3 mm and preferably between 0.05 and 0.10 mm.

In accordance with a preferred embodiment of the invention, the cooking system also comprises at least one cooking utensil defining a food heating surface and being operative to be heated by the electromagnetic flux at the cooking location, and the magnetic field conductor is disposed on the opposite side of the induction coil from the utensil.

In accordance with a preferred embodiment of the invention, the system also includes automatically operative stirring apparatus and/or apparatus for sensing the temperature of a cooking utensil at a cooking location. The apparatus for sensing temperature may include apparatus for obtaining temperature information relating to a utensil from variations in the current passing through the induction coil.

Apparatus may be provided for controlling the supply of heat to a utensil in accordance with the temperature of the utensil and may include apparatus for supplying heat until the temperature of the utensil exceeds the indicated desired temperature by a first threshold and thereafter supplying heat to maintain the difference between the temperature of the utensil and the indicated desired temperature within a second threshold.

The apparatus for controlling may also comprise timing apparatus used to control the heating apparatus.

The cooking utensil preferably includes a curved cooking surface having a generally circular cross sectional configuration and the stirring apparatus preferably includes:

at least one stirrer arranged about a stirrer rotation axis and defining an attachment end and a termination end;

apparatus for rotating the stirrer about the stirrer rotation axis; and apparatus for reciprocally rotating the stirrer about a reciprocal motion axis perpendicular to the stirrer rotation axis such that the termination end moves along the curved cooking surface.

There is also provided in accordance with a preferred embodiment of the invention, for use with a utensil having a curved cooking surface having a generally circular cross sectional configuration, stirring apparatus comprising:

at least one stirrer arranged about a stirrer rotation axis and defining an attachment end and a termination end;

apparatus for rotating the at least one stirrer about the stirrer rotation axis; and apparatus for reciprocally rotating the at least one stirrer about a reciprocal motion axis perpendicular to the stirrer rotation axis such that the termination end moves along the curved cooking surface.

The stirrer preferably has a generally screw-type configuration. The stirring drive apparatus, preferably includes quick coupling apparatus for autocratically coupling the stirrer drive apparatus to the stirrer. The stirring drive apparatus preferably provides first and second rotary drive outputs.

The stirring apparatus preferably includes a utensil contacting member mounted onto the termination end of the stirrer and preferably is selectably orientable with respect thereto so as to correspond to the configuration of the utensil surface when in engagement therewith.

There is also provided in accordance with an embodiment of the invention, stirring apparatus including:

a stirrer having an attachment end and a termination end;

apparatus for mounting the stirrer at the attachment end and driving the stirrer in motion in operative association with a utensil defining a utensil surface; and a utensil contacting member mounted onto the termination end of the stirrer and being selectably orientable with respect thereto so as to correspond to the configuration of the utensil surface when in engagement therewith.

There is also provided in accordance with an embodiment of the invention, a cooking temperature sensor for use with a domestic cooking system including an induction heating apparatus including an induction coil and apparatus for measuring temperature by sensing variations in the current flow passing through the induction coil.

In accordance with an embodiment of the present invention there is provided a cooking utensil formed of a metal and defining a curved cooking surface and a heat transfer member, formed of a metal and having a generally flat bottom surface and a curved top surface engaging the underside of the curved cooking surface.

In accordance with a preferred embodiment of the invention, the cooking utensil is formed of a metal surface having a high electrical resistance and the heat transfer member is formed of a metal having a low electrical resistance. Alternatively both elements may be formed of the same metal.

Additionally in accordance with an embodiment of the present invention, there is provided a cooking system including the above described cooking utensil and including apparatus for providing heating of the flat bottom surface thereof. The apparatus for providing heating may include a conventional electrical resistance heat source or alternatively an inductive heat source.

Stirring apparatus of the type described hereinabove may be employed with the cooking utensil and the cooking system.

The various features of the embodiments described hereinabove may be combined in any suitable combination in accordance with the present invention.

BRIEF DESCRIPTION OF THE DRAWINGS

The present invention will be understood and appreciated more fully from the following detailed description, taken in conjunction with the drawings in which:

FIGS. 13A, 13B and 13C are pictorial illustrations of three typical orientations of a utensil contacting member relative to the termination end of a stirrer, such as that of FIG. 12;

FIG. 14 is a sectional illustration of an alternative embodiment of utensil contacting member; and FIG. 15 is a diagrammatic illustration of the area coverage produced by operation of the stirring apparatus of FIG. 8.

DETAILED DESCRIPTION OF THE INVENTION

Figure 1A:
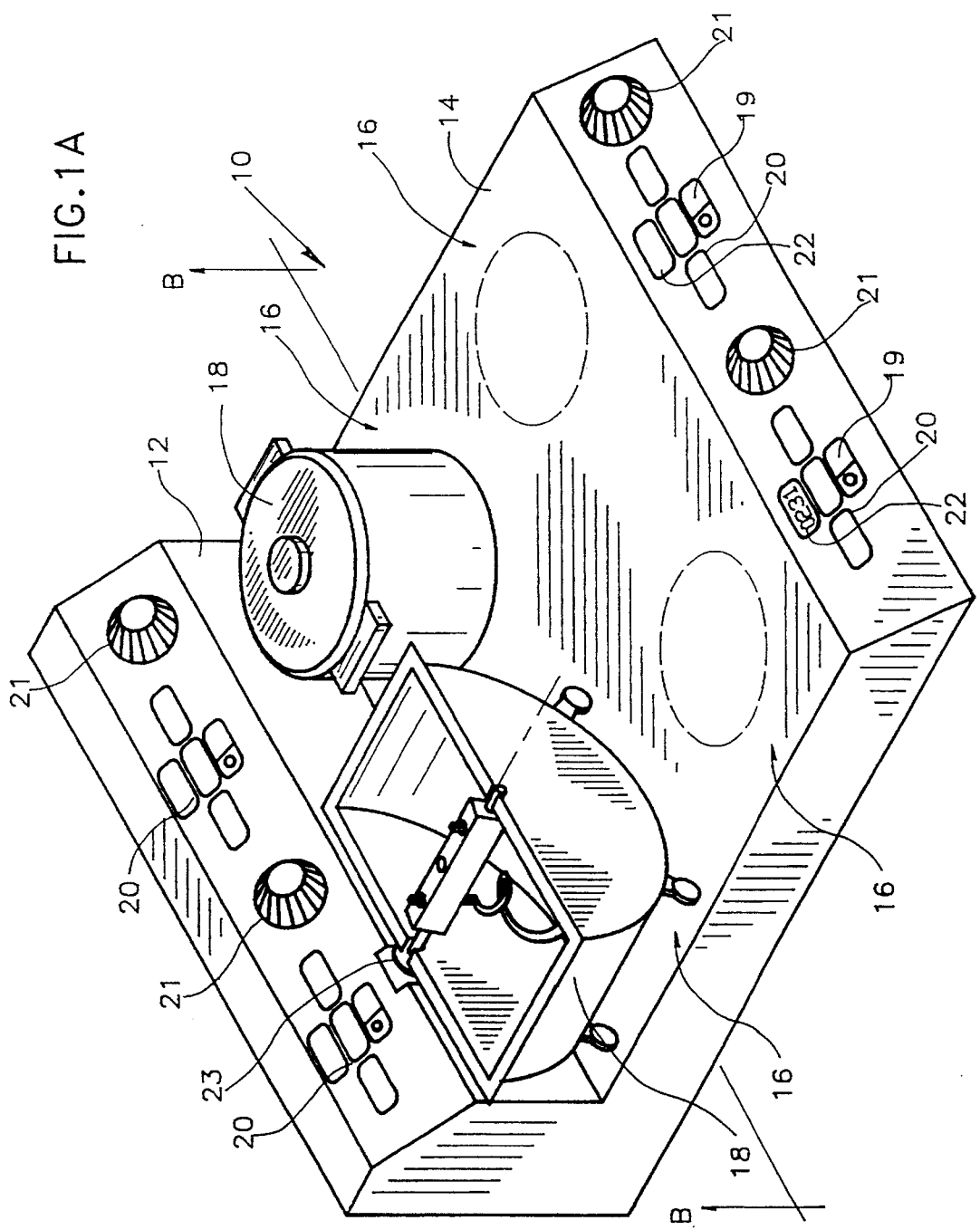
FIGS. 1A and 1B are respective pictorial and partially cut away front view illustrations of a domestic cooking system constructed and operative in accordance with a preferred embodiment of the present invention.
Figure 1B:
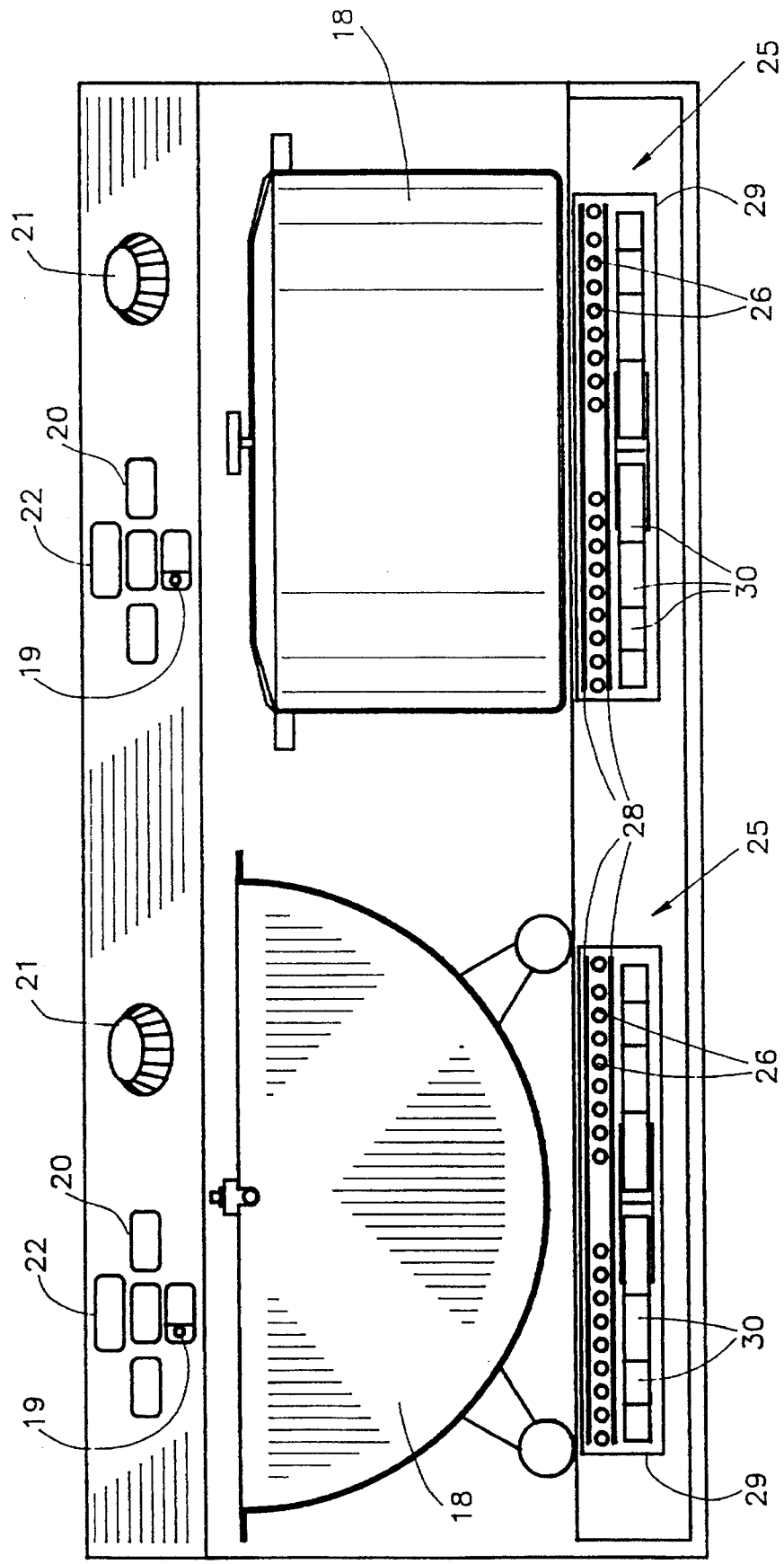

Reference is now made to FIGS. 1A and 1B which illustrate a cooking system constructed and operative in accordance with a preferred embodiment of the present invention and comprising a cooking center 10, including a back portion 12 and a base portion 14, defining a plurality of cooking locations 16, each arranged for operative association with a cooking utensil 18. Preferably the top surface of base portion 14 is formed of ceramic glass.

The back portion 12 and the base portion 14 comprise various controls for each of the cooking locations 16, such as on-off, temperature and timing controls which may be embodied, for example, in a switch 19 with associated indicator light, a keyboard 20 and a dial 21. A status display 22, such as an LCD display, may also be provided. Also mounted on back portion 12 is a coupler 23 of a stirrer drive assembly, which is not seen in FIGS. 1A–1B, insofar as it is located at the interior of back portion 12.

The base portion 14 typically defines four cooking locations. Each cooking location is typically provided with induction heating apparatus 25, which is not seen in FIG. 1A inasmuch as it is located within base 14.

In the embodiment of FIGS. 1A and 1B, for the sake of illustration, all of the cooking locations are provided with induction heating apparatus, although this need not be the case.

In FIG. 1B, which represents a section taken along the lines B—B in FIG. 1A, cooking utensils formed of high resistance electrically conductive materials, such as iron and stainless steel, and of low resistance electrically conductive materials, such as aluminum, may be employed. For the purposes of the present application, the term "high resistance" refers to materials having an electrical resistance within the general range extending from 0.05 ohm mm$^2$/meter and higher, and preferably at least 0.1 ohm mm$^2$/meter and including iron at 0.1 ohm mm$^2$/meter and stainless steel, typically at 0.72 ohm mm$^2$/meter. The term "low resistance" refers to materials having an electrical resistance within the general range below 0.05 ohm mm$^2$/meter and preferably below 0.03 ohm mm$^2$/meter and including aluminum at 0.0285 ohm mm$^2$/meter and copper at 0.0175 ohm mm$^2$/meter.

Figure 6:
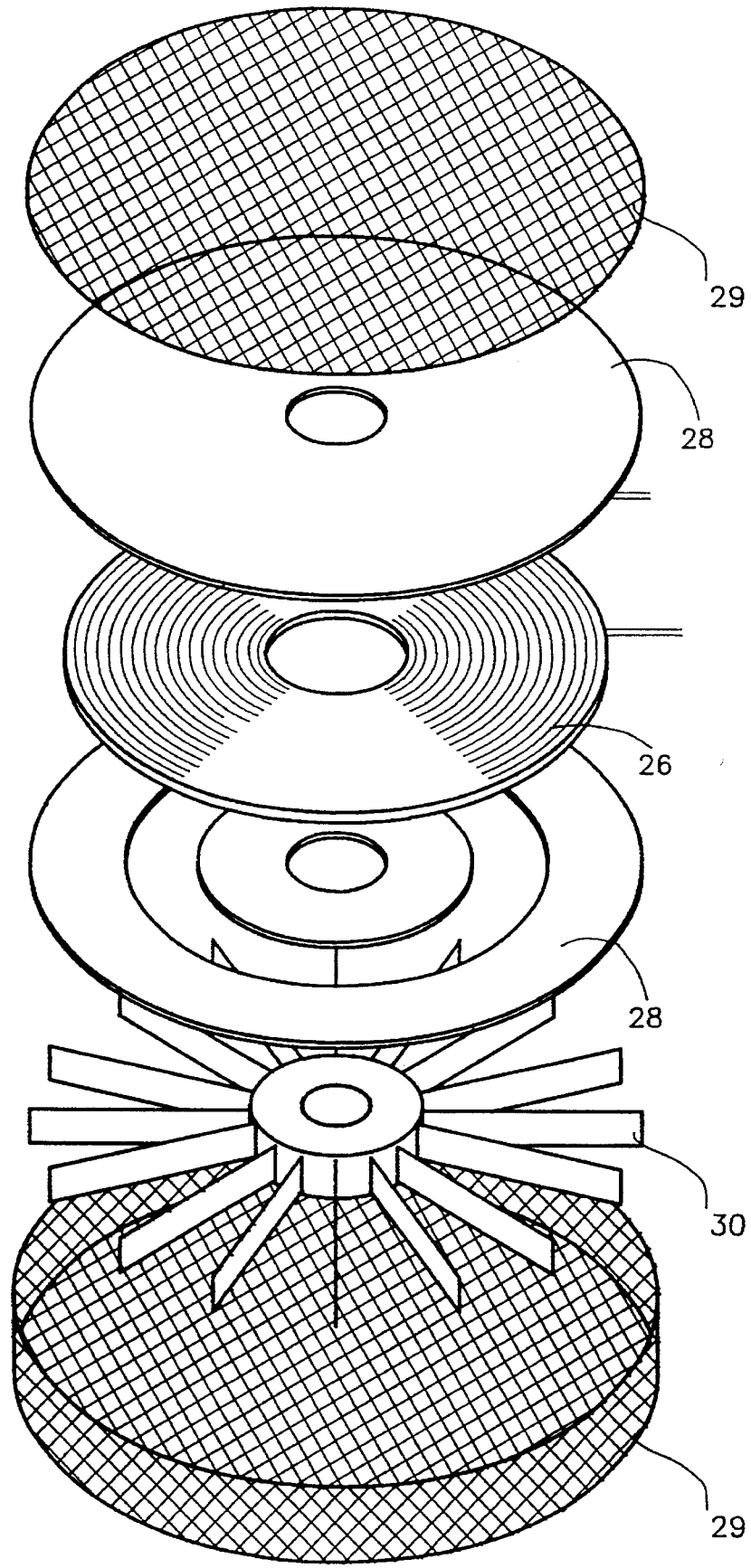
FIG. 6 is an exploded view illustration of induction heating apparatus constructed and operative in accordance with a preferred embodiment of the present invention.

A preferred embodiment of the induction heating apparatus 25 is illustrated in FIG. 6 and comprises an induction coil 26 comprising an electrical conductor which carries a current flow and is typically, but not necessarily, in the form of one or more coils, which lie in a single plane or alternatively in a plurality of generally parallel planes. Preferably associated with induction coil 26 and lying thereover and thereunder are layers of electrical insulation 28, which may be continuous or alternatively apertured, the apertures being configured and arranged as illustrated in FIG. 6, in order to provide an air flow path therepast, which may be useful when a ventilator (not shown) is provided in base portion 14. Disposed under coil 26 is a magnetic field conductor assembly 30, various embodiments of which are illustrated in FIGS. 7A–7H.

In accordance with a preferred embodiment of the invention, shielding apparatus 29 is disposed between induction coil 26 and cooking location 16 for providing electric field shielding therebetween without appreciably reducing the magnetic flux provided to the cooking location and without being itself heated to an unacceptable degree. Preferably apparatus 29 is operative to surround the induction heating apparatus and to provide electromagnetic shielding thereof, while permitting the substantially unimpeded passage of magnetic flux thereacross to the cooking location.

According to one embodiment of the invention, the shielding apparatus 29 is formed of expanded stainless steel mesh. According to an alternative embodiment of the invention, the apparatus 29 is formed of a woven or non-woven fabric including conductive fibers, such as carbon or metal fibers. Alternatively non-conductive fibers which are coated with a conductive coating may be employed.

According to one preferred embodiment of the invention, suitable for heating cooking utensils having aluminum bottom surfaces, the coil 26 has an inner diameter of 40 mm, an outer diameter of 170 mm and a thickness of 5.2 mm. In this example, the coil has 120 turns and is formed of Litz wire, which is formed of 96 individually lacquered filaments, each of 0.13 mm diameter. Preferably, during operation, a voltage of about 2000 volts AC is provided across coil 26 at an operative frequency of 22 KHz, providing, together with magnetic field conductor assembly 30, an inductance of about 3400 microHenry.

Figure 7I:
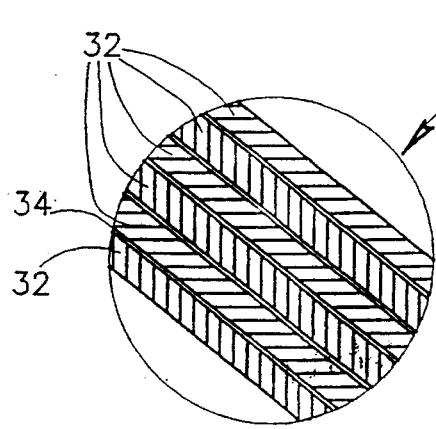
FIG. 7I illustrates an enlarged portion of the foil assembly of FIG. 7A.
Figure 7A:
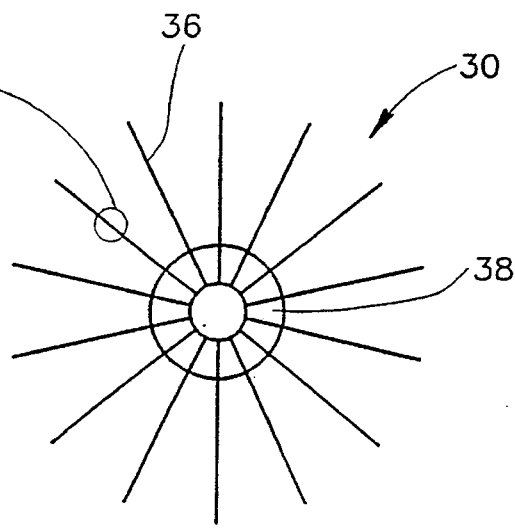
FIG. 7A is a top plan view illustration of a foil assembly forming part of the embodiment of FIG. 6.

As seen particularly in FIG. 7A, the magnetic field conductor assembly 30, in accordance with a preferred embodiment of the invention, comprises an array of foils of a magnetic field conductive material, which are arranged to lie non-parallel and preferably generally perpendicularly to the plane or planes of the induction coil 26, so as to minimize the generation of eddy currents in the foils.

Preferably the magnetic field conductors are formed of a high permeability material, such as an amorphous metal, and are typically each of thickness 0.025 mm. Some preferred materials are Ultraperm 10, Permenorm (5000 H2 and 5000Z) and Vitrovac 4040, all of which are commercially available from Vacuumschmelze of Human, West Germany.

In the preferred embodiment illustrated in FIGS. 7A and 7I, a plurality of separate foils 32, each separated from the adjacent foil by an insulator 34, are arranged to define radially extending sub-assemblies 36, which extend radially outward from the center of the assembly. The foils are typically retained in position by an insulative retaining ring 38, which may be provided at any suitable radial distance from the center of the assembly.

According to a preferred embodiment of the invention, each of foils 32 has a ratio of width in the direction generally perpendicular to the plane of the induction coil 26 relative to thickness in the plane of the induction coil of at least about 10 and preferably at least about 200. A preferable ratio is 600.

Figure 7C:
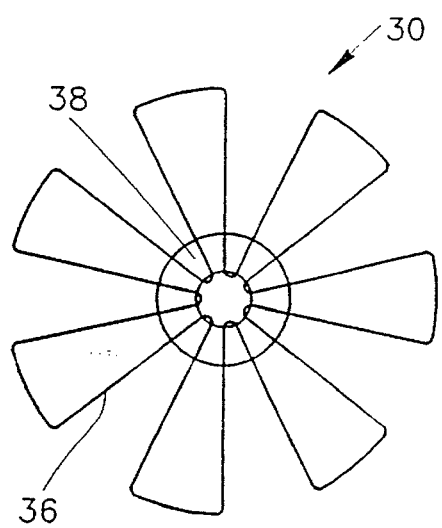
FIGS. 7B, 7C, 7D, 7E, 7F, 7G and 7H are top view illustrations of alternative embodiments of a magnetic field conductor useful in the embodiment of FIG. 6.
Figure 7B:
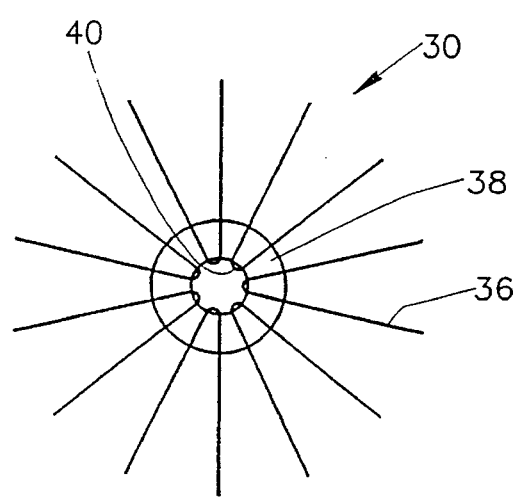

According to an alternative embodiment of the invention, illustrated in FIG. 7B, each adjacent two sub-assemblies 36 are in fact defined by a single plurality of foils, which is bent adjacent the center of the assembly, as indicated at reference numeral 40.

According to a further alternative embodiment of the invention, illustrated in FIG. 7C, all of the sub-assemblies 36 are together defined by a single plurality of foils which extends intermittently both radially and circumferentially.

Figure 7D:
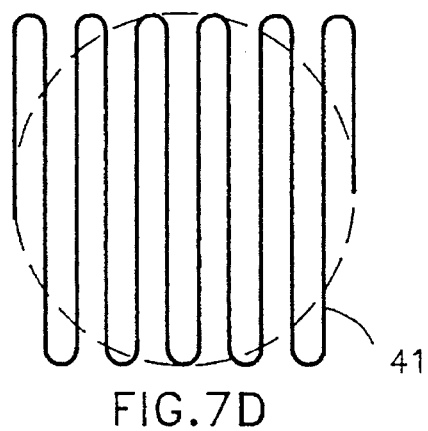
Figure 7E:
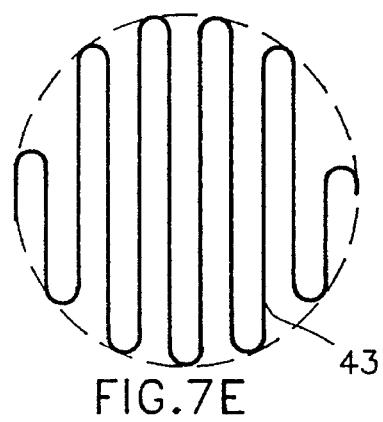

According to a further alternative embodiment of the invention, illustrated in FIG. 7D, one or a plurality of foils is arranged in a continuous undulating generally parallel array 41 having an overall generally square configuration. In FIG. 7E, an undulating array 43 has an overall generally circular configuration, underlying coil 26.

Figure 7F:
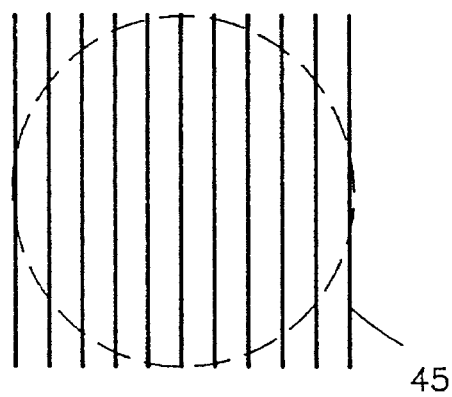
Figure 7G:
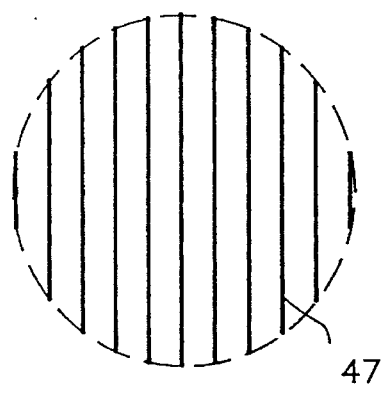

In FIGS. 7F and 7G, an array of separate parallel foils or groups of foils is provided. In FIG. 7F, the overall configuration of the array 45 is square, while in FIG. 7G, the overall configuration of the array 47 is circular and conforms to the configuration of coil 26.

Figure 7H:
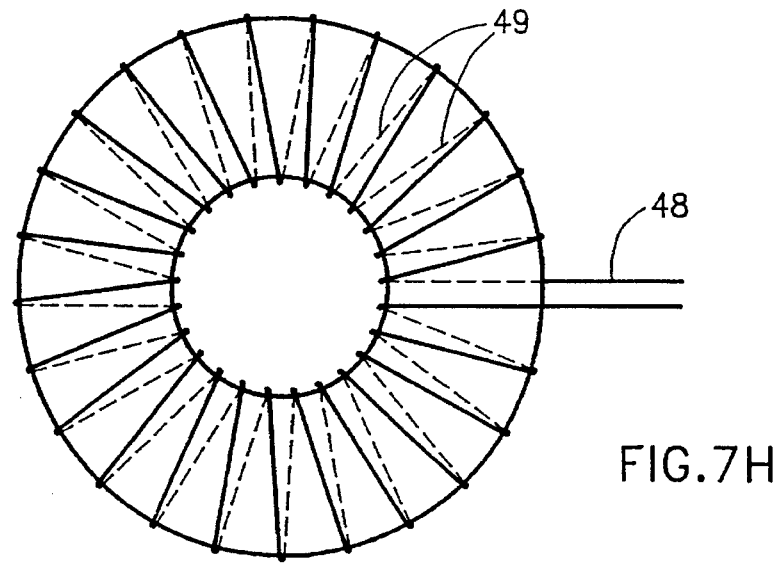

In accordance with a further alternative embodiment of the present invention, illustrated in FIG. 7H, the magnetic field conductor assembly 30 may comprise a ferromagnetic wire 48 wound in a generally toroidal arrangement to define a plurality of loops 49, each of which is disposed generally in a plane generally perpendicular to the plane of coil 26.

It is a further particular feature of the present invention that the inductively heated cooking utensil need not necessarily have a flat bottom surface or a flat food cooking surface.

It is a particular feature of the invention that the magnetic flux produced by induction coil 26 in response to passage of suitable current therethrough is spatially defined by the utensil 18 and by magnetic field conductor assembly 30. The use of thin foils 32 or loops extending generally non-parallel and preferably generally perpendicularly to the plane of the induction coil 26 instead of a thicker body of ferromagnetic material lowers the heating of the induction heating apparatus 25 as compared with the heating which would occur in a relatively thicker body of ferromagnetic material, such as ferrite, particularly if oriented parallel to the plane of the coil, thus increasing efficiency and inductance.

It is a particular feature of the present invention that foils 32 or wire 48 are formed of a material, such as amorphous metal, which has a relatively high Curie temperature and high permeability, especially at the operating frequency of induction heating apparatus 25, typically 22 KHz.

Figure 1C:
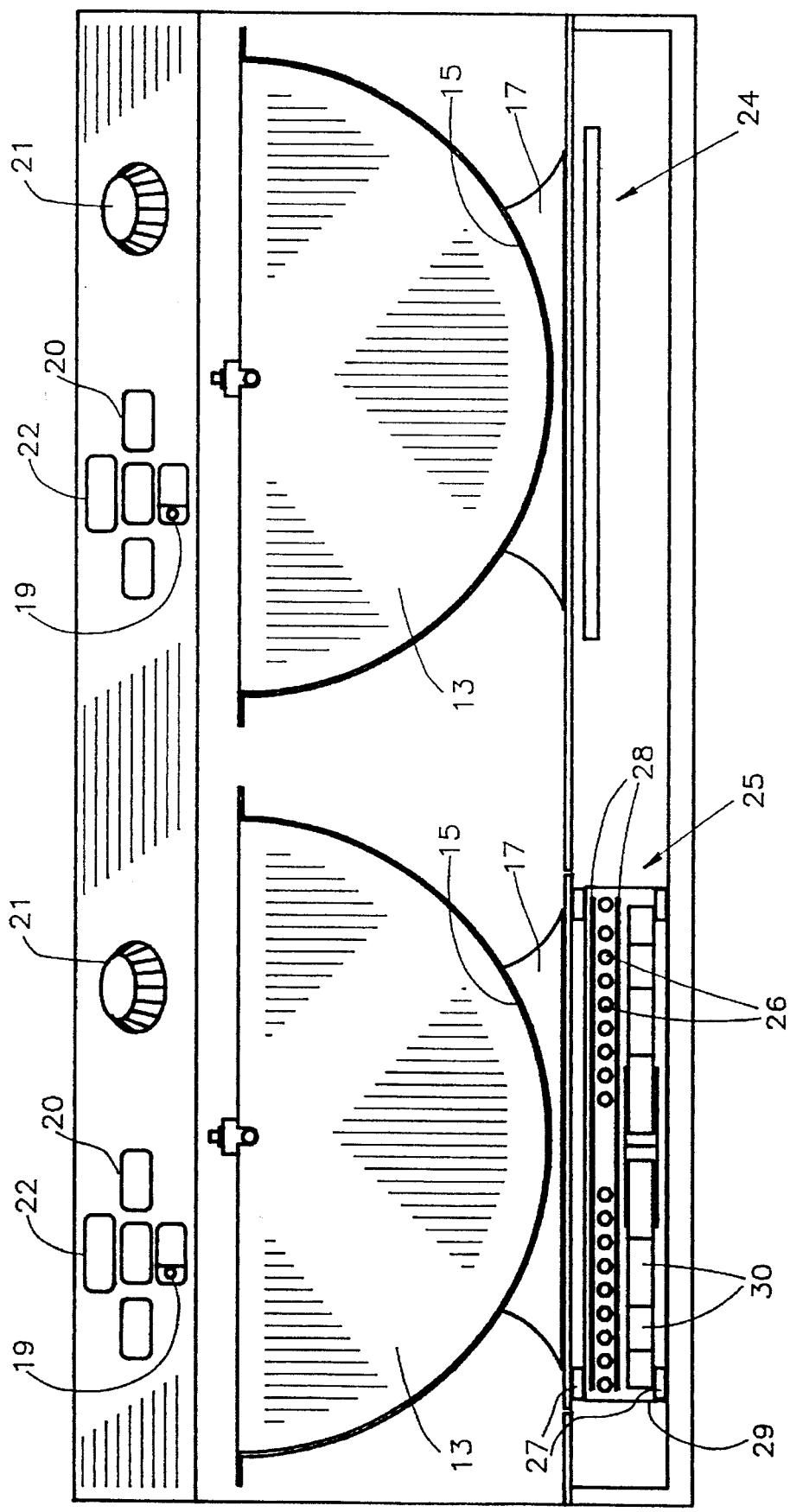
FIG. 1C is a partially cut away front view illustration of a domestic cooking system constructed and operative in accordance with another preferred embodiment of the present invention.

Reference is now made to FIG. 1C, which illustrates a system which is generally similar to that of FIG. 1B, except as described hereinbelow. In the embodiment of FIG. 1C, the cooking utensil 13 is formed of a metal and defines a curved cooking surface 15. There is also provided a heat transfer member 17, formed of a metal and having a curved top surface engaging the underside of the curved cooking surface and a generally flat bottom surface.

In accordance with a preferred embodiment of the invention, the cooking utensil 13 is formed to have a metal surface having a high electrical resistance and the heat transfer member 17 is formed of a metal having a low electrical resistance. This structure is particularly suitable for use with induction heating apparatus, such as that illustrated at reference number 25 in FIG. 1C. Alternatively both elements 13 and 17 may be formed of the same metal. This alternative arrangement is suitable for use with a conventional resistance heating element, indicated by reference numeral 24. If a conventional resistance heating element is employed, the utensil may be formed of any suitable material, which need not necessarily be metal.

Induction heating apparatus 25 is generally similar to that shown in FIG. 1B and described hereinabove. It may, however, be modified as will now be described. These modifications may also be employed where suitable in the various other embodiments of the invention described in the specification. Vibration absorbing apparatus 27 is preferably provided between the induction heating apparatus 25 and both the top and bottom surfaces of the base portion 14. Additionally, the top surface of the base portion 14 above each cooking location may be vibrationally decoupled from the remainder of the top surface of the base portion.

Figure 2:
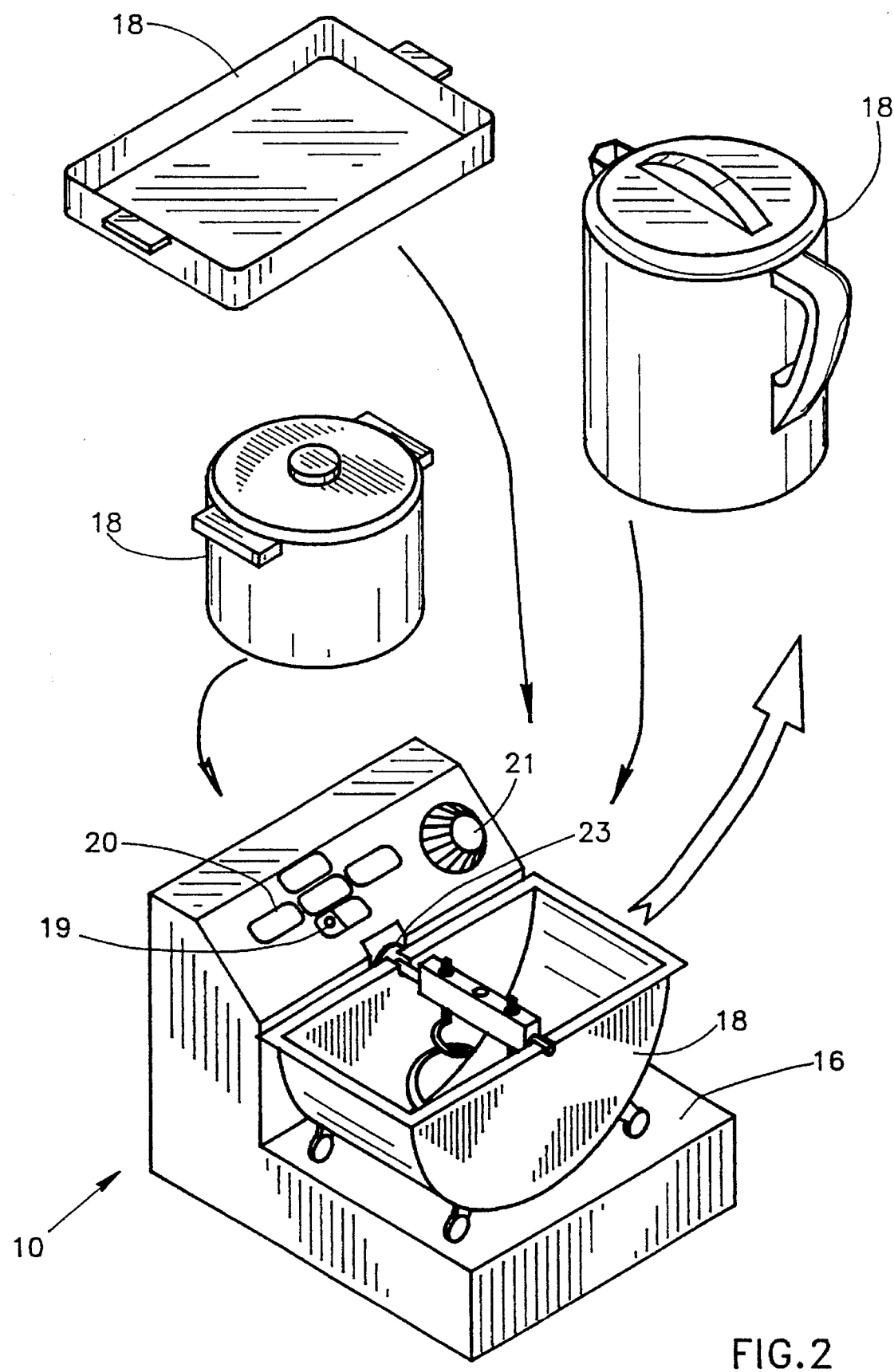
FIG. 2 is a pictorial illustration of the use of a variety of different cooking utensils in accordance with a preferred embodiment of the invention.

Reference is now made to FIG. 2 which illustrates the modularity and flexibility of the cooking system of the present invention, wherein a single cooking location may alternatively accommodate a plurality of different utensils having different configurations, including, for example, both flat and curved bottom surfaces. In accordance with a preferred embodiment of the invention, utensils having bottom surfaces of either high or low electrical resistance, such as copper and aluminum, may be used with the present invention.

The utensils usable with the present invention include both special purpose utensils including stirring apparatus as well as entirely conventional cooking utensils, such as those seen in FIG. 2.

Figure 3:
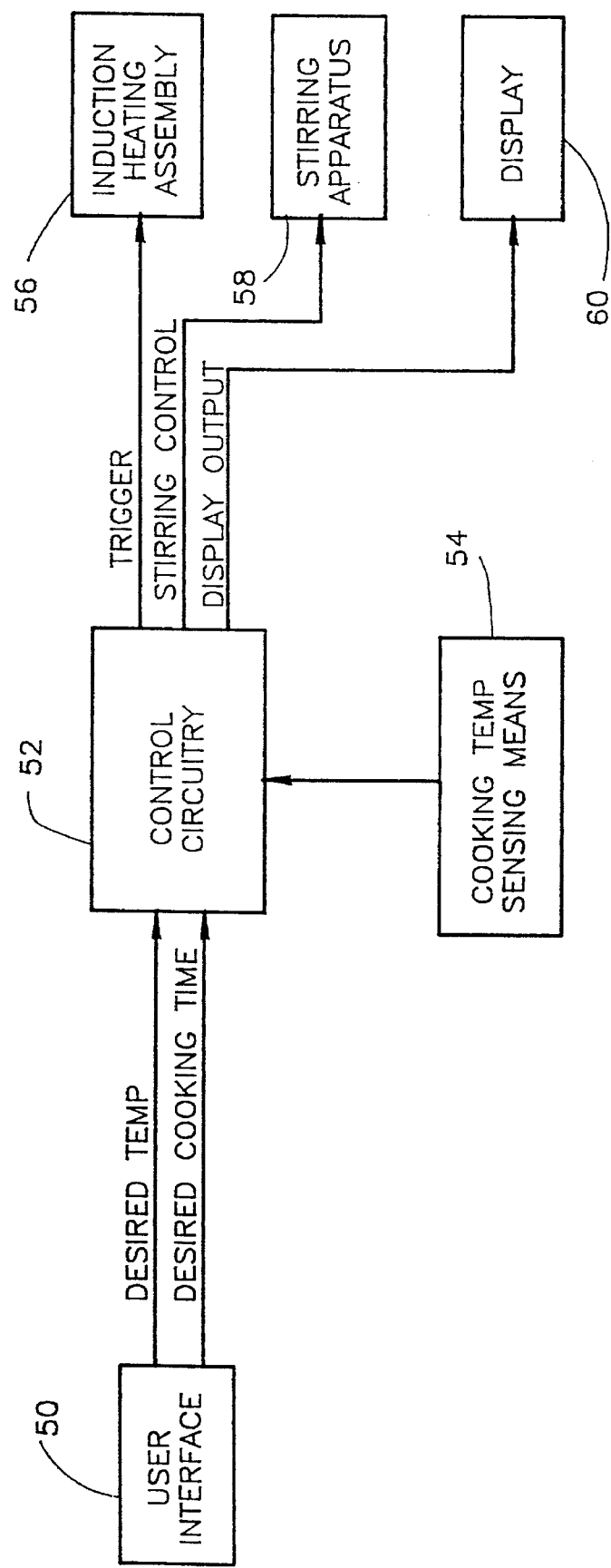
FIG. 3 is a generalized electrical diagram of control circuitry useful in the present invention.

Control apparatus employed in the cooking center is illustrated in FIG. 3 and includes user interface apparatus 50, typically incorporating switch 19, keyboard 20 and dial 21 (FIG. 1A), which provide control inputs relating to desired cooking time and desired temperature to control circuitry 52. Control circuitry 52 also receives a temperature input from temperature sensing apparatus 54 and provides a trigger output to induction heating assembly 56, a stirring control output to a stirring assembly 58, described hereinbelow, and a display output to a display 60, such as display 22 (FIG. 1). A detailed schematic illustration of the control circuitry appears in FIGS. 4A, 4B, 4C, 4D, 4E and 4F, it being noted that the user interfaces 50, cooking temperature sensors 54 and induction heating assembly 56 for only one cooking location are shown.

Preferably, the induction heating assembly 56 includes an induction coil 26 which is powered by switching power and control circuitry which provides a train of AC pulses having a frequency of about 22 KHz. The control circuitry, illustrated in FIGS. 4A–4F, includes a power circuit 200, typically receiving a 220 Volt 50 cycle, electric mains input. The power circuit 200 comprises a bridge rectifier 202 and a pair of capacitors 204 and 206 providing voltage rectification. The junction of capacitors 204 and 206 is coupled via a high voltage relay 208 to one of two capacitors 210 or 212, which are in turn connected to the outer turn and the intermediate turn of induction coil 26.

Relay 208 is operative to adapt the induction producing apparatus of the present invention for use with cooking utensils whose bottom surfaces have either high or low electrical resistance. When a cooking utensil having a bottom surface with high electrical resistance, such as stainless steel, is employed, the relay 208 connects the junction of capacitors 204 and 206 to an intermediate turn of induction coil 26, via capacitor 212. When a cooking utensil having a bottom surface with a low electrical resistance, such as aluminum, is employed, the relay 208 connects the junction of capacitors 204 and 206 to the outermost turn of induction coil 26 via capacitor 210.

The interior turn of the induction coil 26 is coupled via sampling apparatus 220 to the junction of two series connected transistor switches 214 and 216, which are operative to provide a high frequency driving voltage across the induction coil 26 and either of capacitors 210 and 212.

First sampling apparatus 218 samples the mains current, while second sampling apparatus 220 samples the peak current of transistor switches 214 and 216. The sampled information from apparatus 218 passes through circuitry 221 to a voltage controlled oscillator 224 which increases its output frequency as the sensed mains current increases.

The sampled information from apparatus 220 is processed by a current detector 226 and is used to select the switching condition of relay 208. It is appreciated that apparatus 220 is operative to determine whether a utensil being heated by the induction heating apparatus of the present invention has a bottom surface with a high or low electrical resistance. In this way, the apparatus of the present invention is able to distinguish between, for example, utensils having stainless steel and aluminum bottoms and to be operative to safely and efficiently heat both types of utensils.

According to an alternative embodiment of the present invention, relay 208 may be eliminated and the apparatus of the present invention may be designed to operate only with utensils having either high or low electrical resistance bottom surfaces.

The sampled information from apparatus 220 is also supplied to circuitry 228 and is employed fox protecting circuit elements.

Circuitry 230 (FIGS. 4A and 4B) provides timing, induction heating control, motor control and display functions.

Figure 4A:
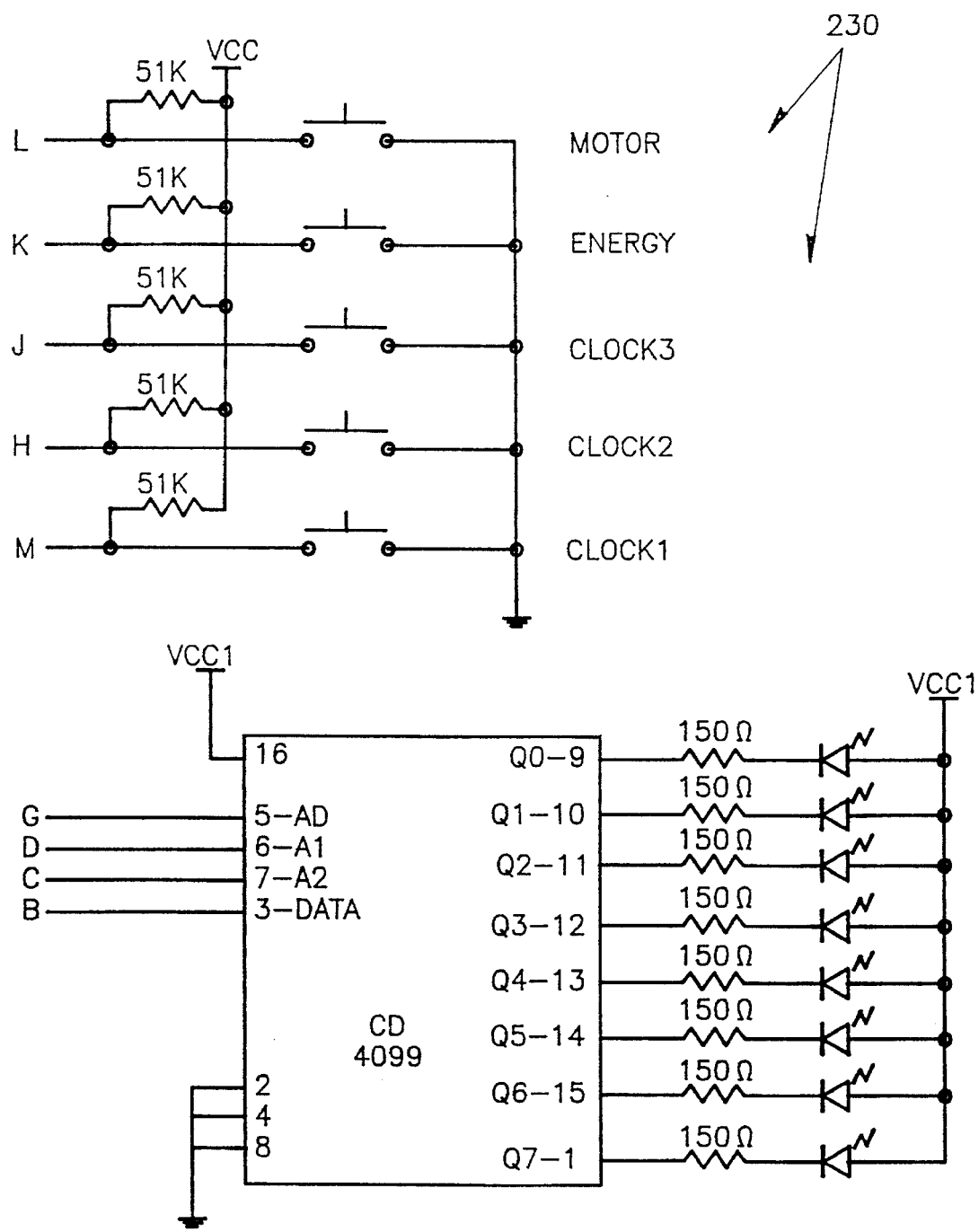
FIGS. 4A, 4B, 4C, 4D, 4E and 4F are electrical schematic illustrations of the control circuitry of FIG. 3.
Figure 4B:
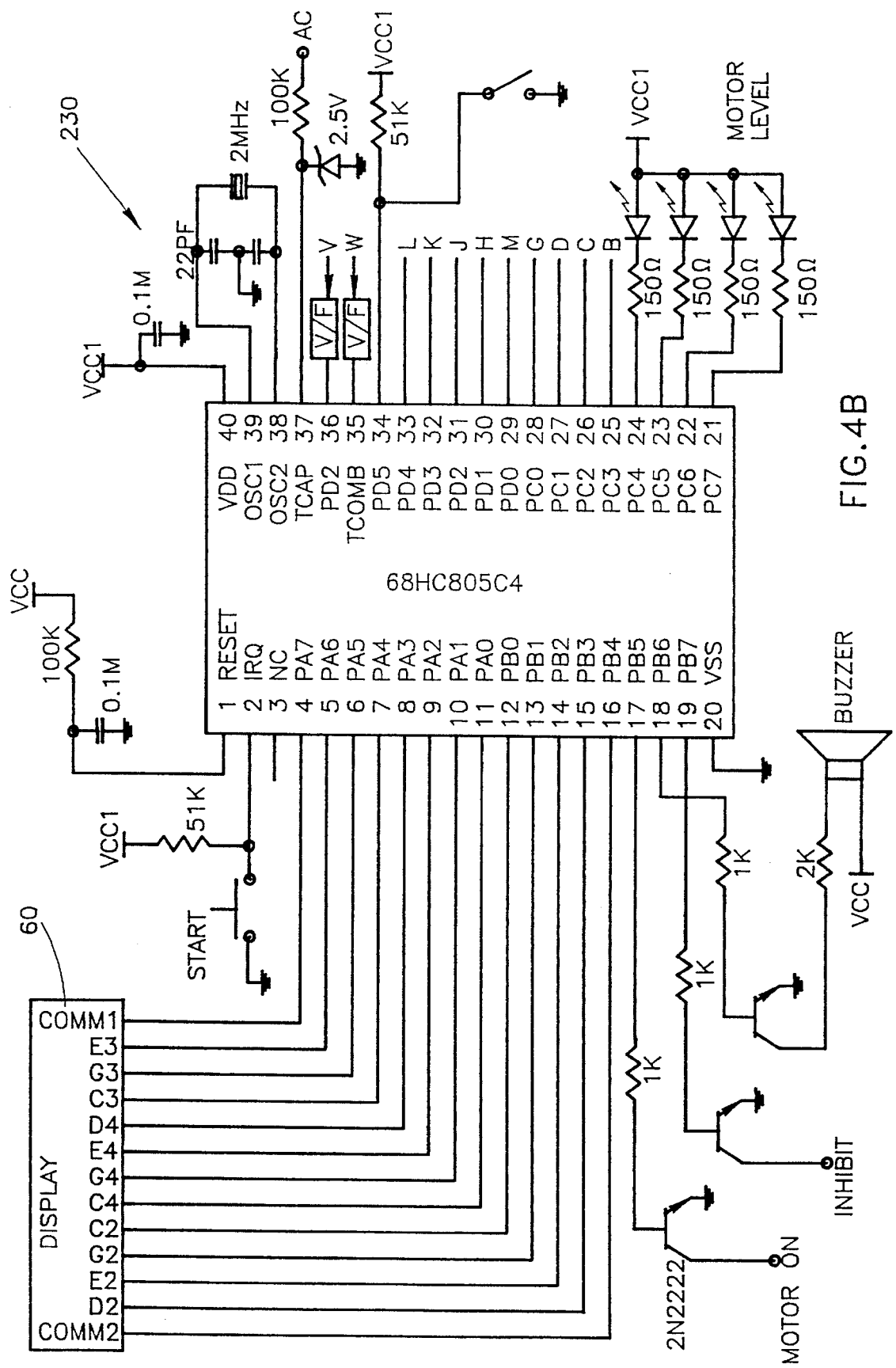
Figure 4C:
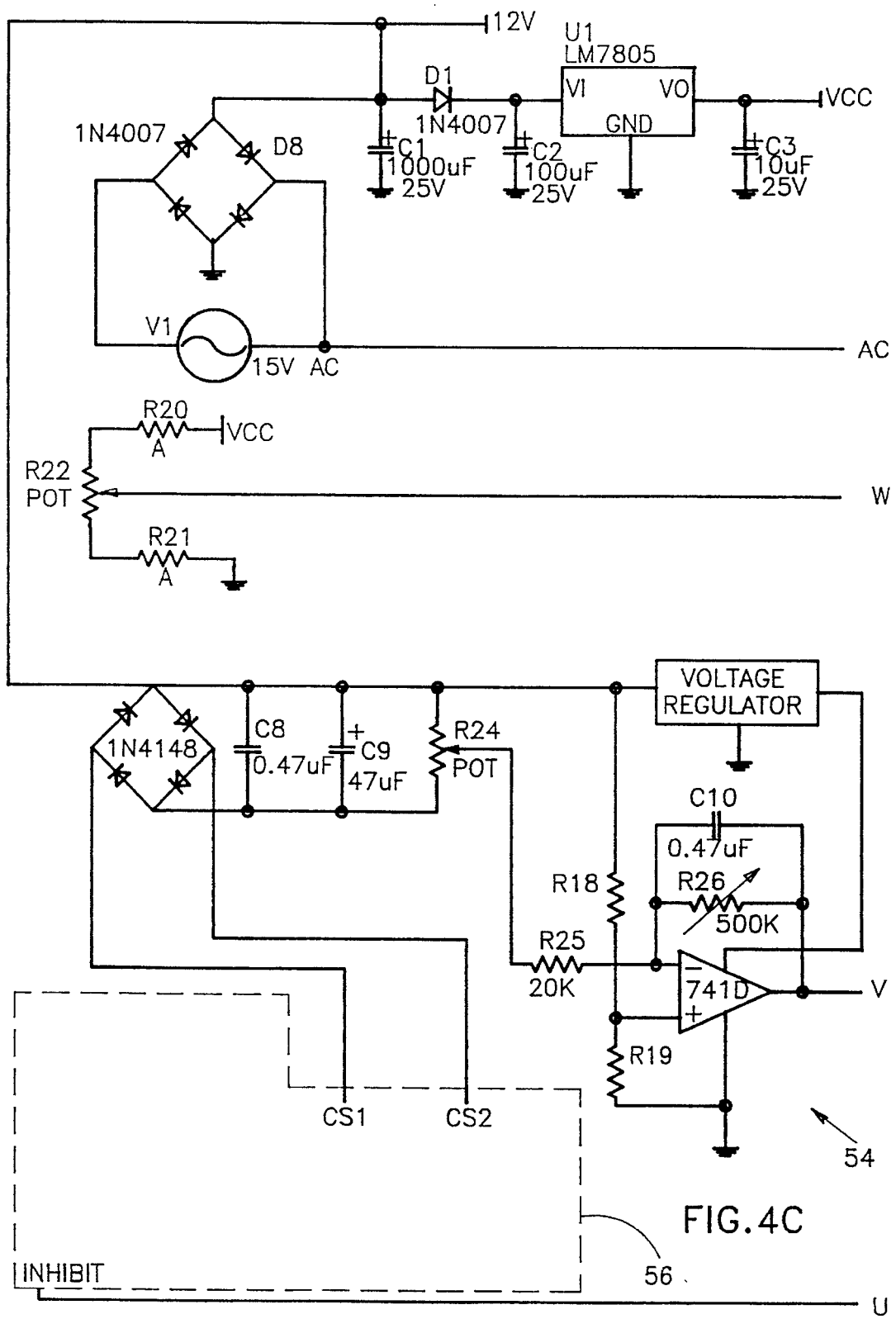
Figure 4D:
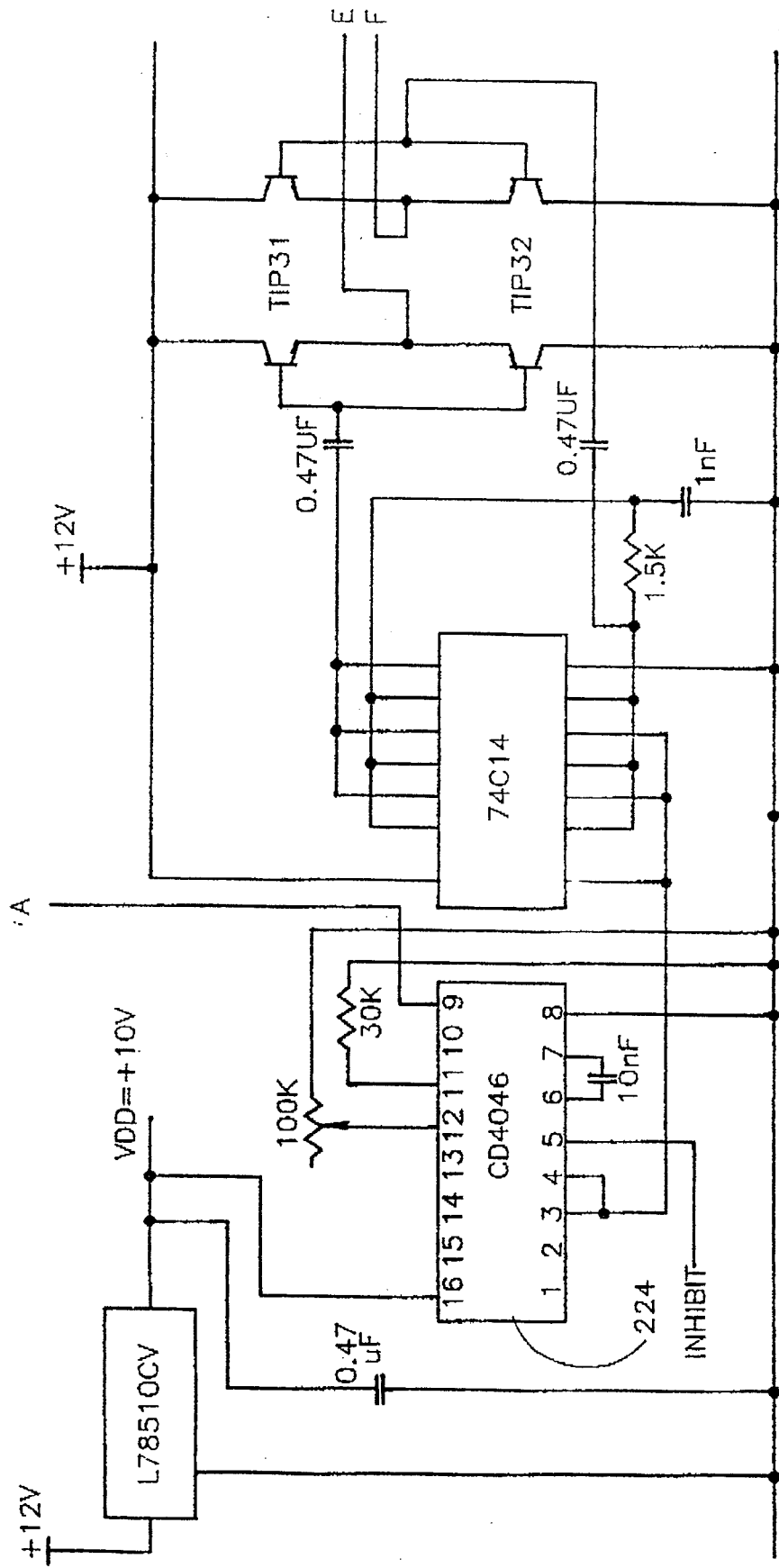
Figure 4E:
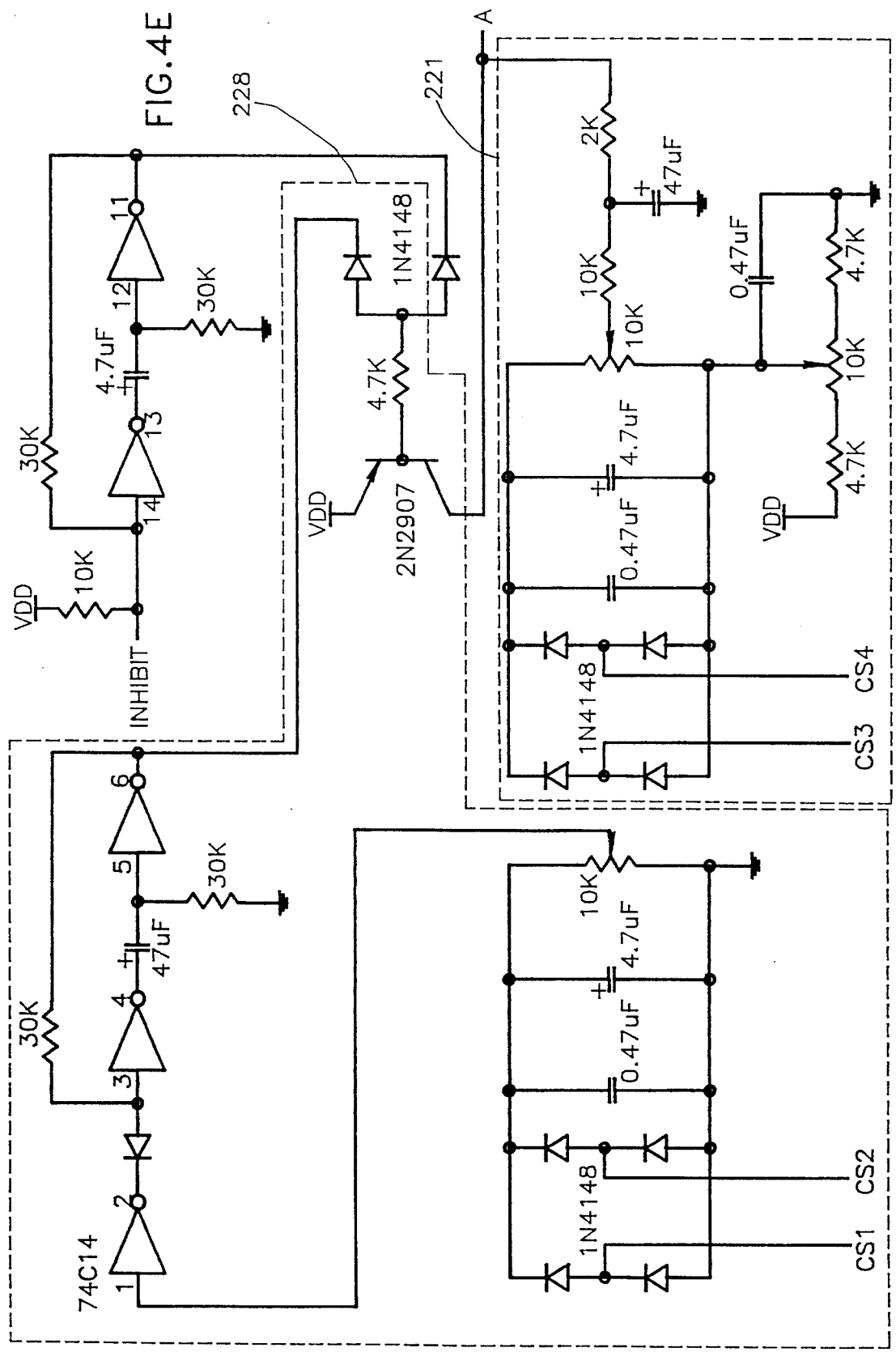
Figure 4F:
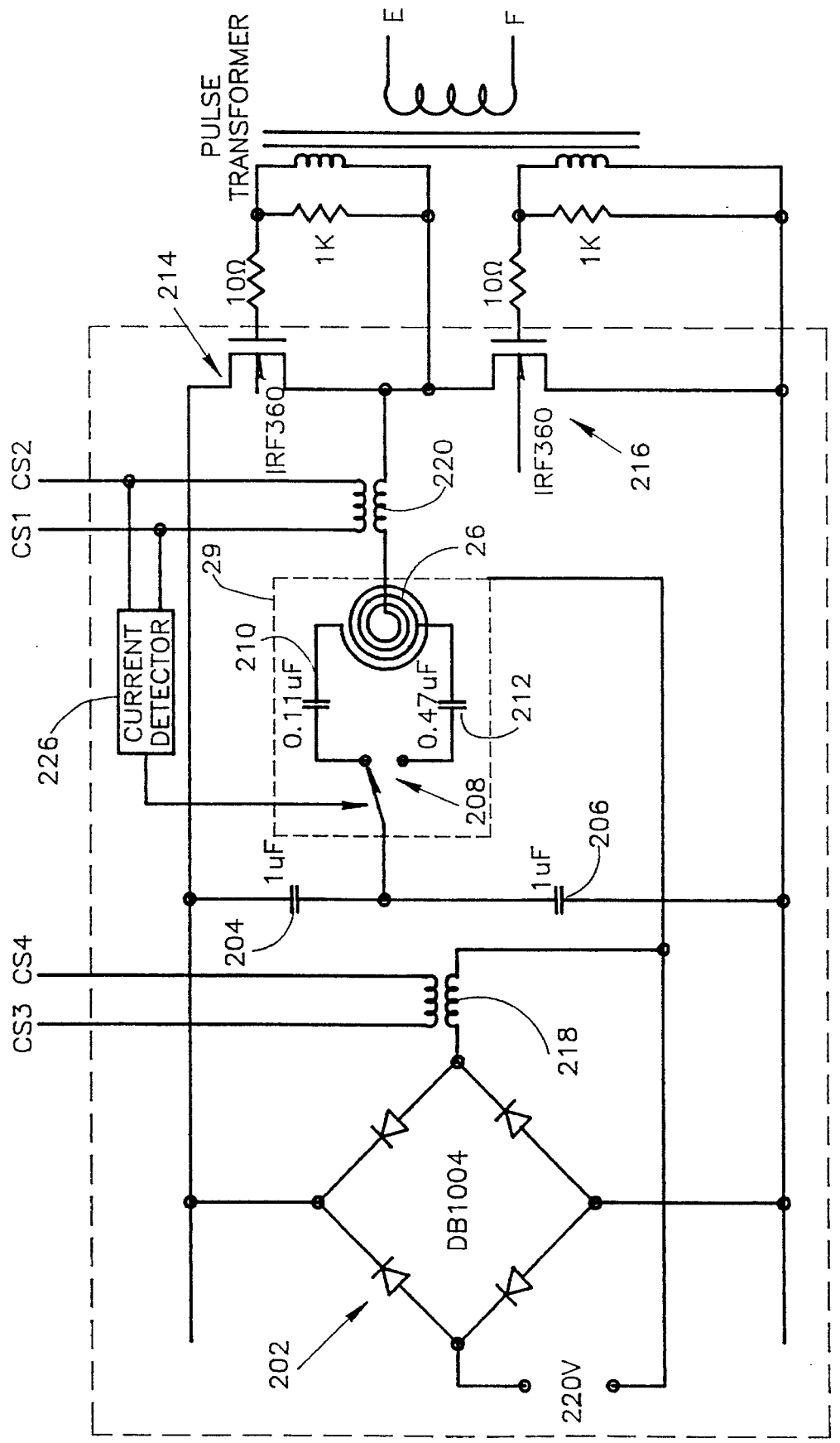

It is particular feature of the present invention that the circuitry of FIG. 4C includes temperature sensors 54 which measure temperature by sensing the current flow passing through induction coil 26. Variations in the current flow provide indications of variations in temperature.

Figure 5:
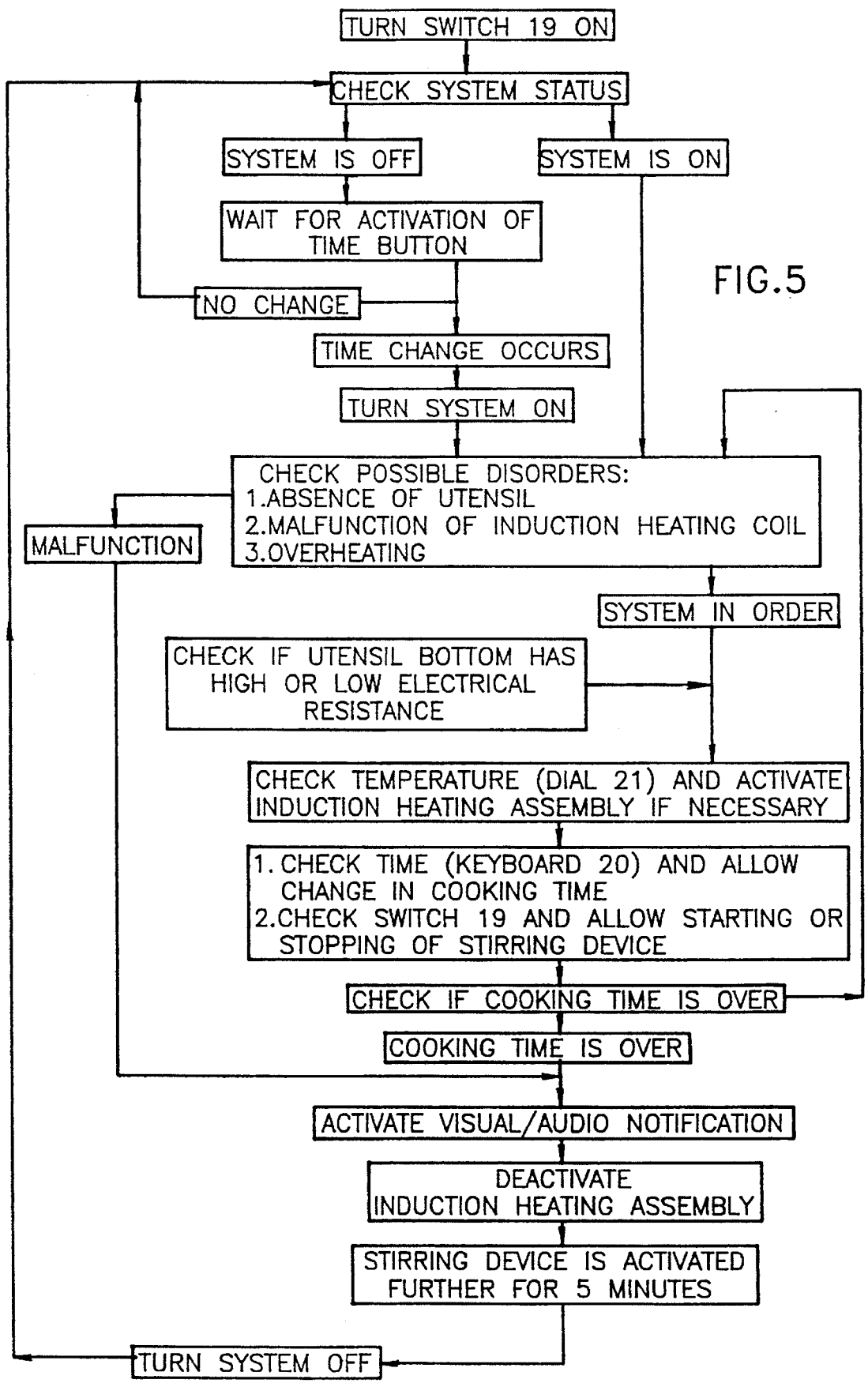
FIG. 5 is a flow chart illustrating the operation of the control circuitry of FIGS. 3 and 4.

Reference is now made to FIG. 5, which is a generalized flow chart illustrating the operation of the circuitry of FIGS. 4A–4F. As can be seen from the flow chart, upon turning on the system for a cooking location by operating switch 19, following system initialization and fault checks, the system determines if a utensil located at the cooking location has a bottom surface having high or low electrical resistance and adapts the operation of the circuitry of FIGS. 4A–4F, such as by means of relay 208, accordingly. Alternatively, where the system is adapted for use only for utensils whose bottom surface has either a high or low electrical resistance, the system will operate only in the presence of the appropriate type of utensil.

Normally the system will periodically check to ensure that the utensil having an indicated resistance has remained at the cooking location, in order to prevent damage to the induction heating system or inefficient operation thereof.

The system checks the desired temperature indicated by dial 21 and compares it with the temperature indicated by the temperature sensing apparatus. The induction heating assembly is operated as appropriate.

The following subroutine may be employed at this stage:

1. Operate the induction coil 26 and measure the temperature every 10 seconds until the predetermined desired temperature indicated by dial 21 is reached;

2. When the measured temperature exceeds the predetermined temperature, such as 100 degrees Centigrade, shift to pulsed operation of the induction heating generator (such as operation for one second followed by a 10 seconds interval) until the measured temperature falls below the predetermined temperature and return to step 1.

According to an alternative embodiment of the invention, when the measured temperature is less than the predetermined temperature, instead of step 2, the induction heating apparatus maybe operated continuously until a weighted temperature is reached, the weighted temperature being greater than the predetermined temperature, typically by a factor of about 1.2 times the difference between the measured temperature and the predetermined temperature. Once the measured temperature reaches the weighted temperature, the induction heating apparatus is operated according to step 2.

Additionally the system operates to monitor the remaining desired cooking time and the ON status of switch 19. It provides for operation of the stirring device throughout cooking or as desired by the user. Upon termination of the desired cooking time, the induction heating apparatus is turned off and the stirring is typically continued for a given period and then terminated. Visual and/or auditory notification of completed cooking may be provided to the user.

Reference is now made to FIGS. 8–15 which illustrate stirring apparatus constructed and operative in accordance with a preferred embodiment of the present invention. The stirring apparatus including a stirring assembly, indicated generally by reference numeral 60, is illustrated most clearly in FIG. 8.

Figure 11A:
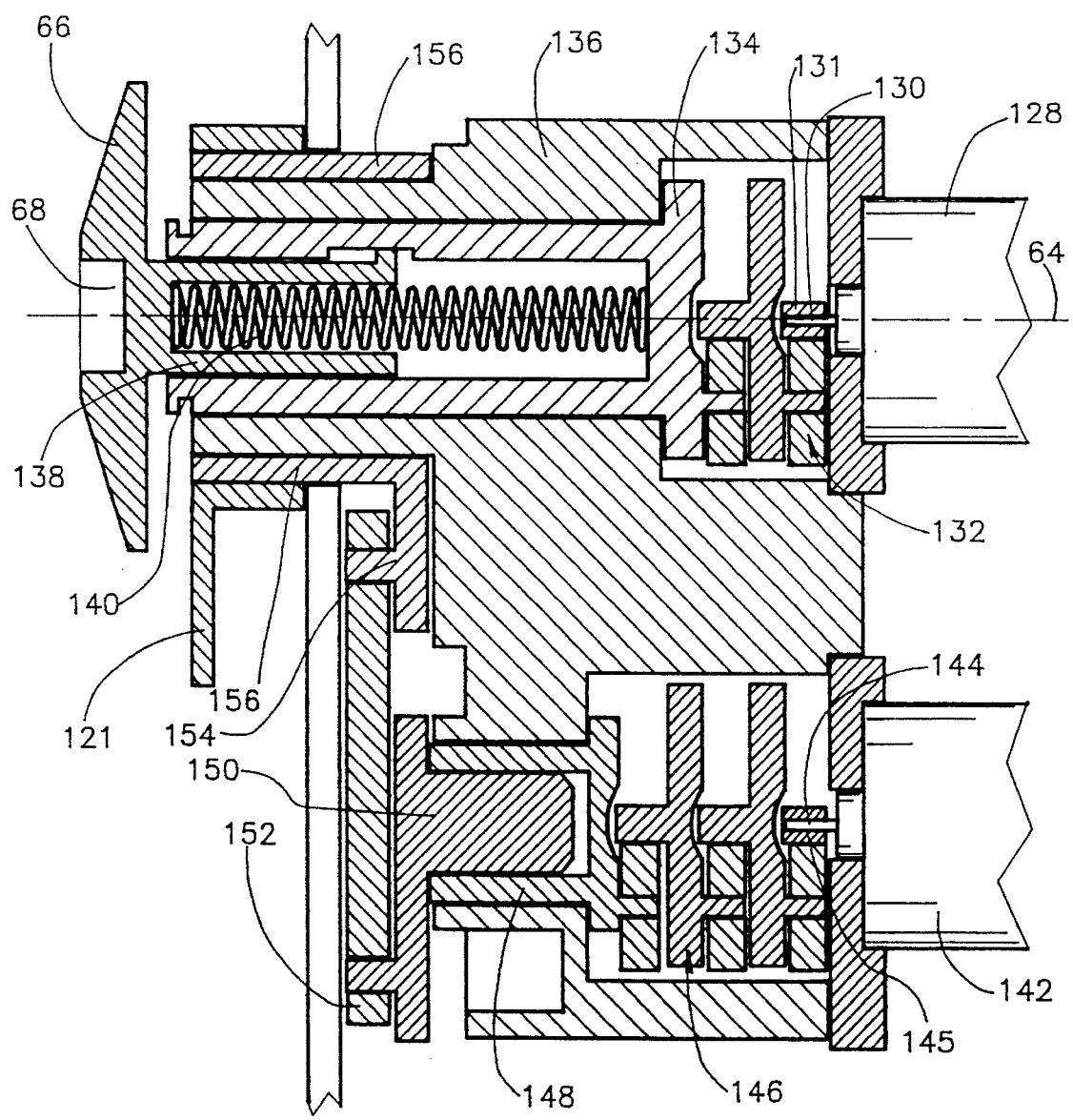
FIGS. 11A and 11B are respective side and plan view illustrations of stirring drive apparatus useful in association with the apparatus of FIGS. 8–10C.
Figure 11B:
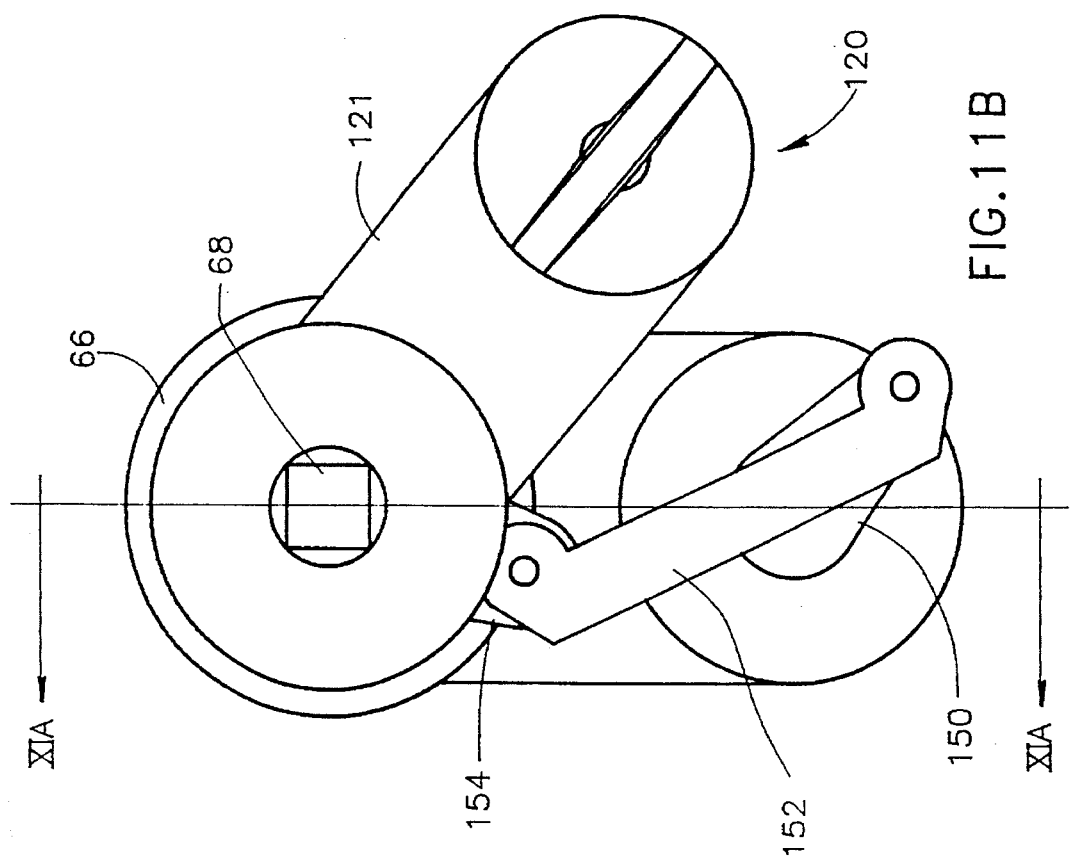

Stirring assembly 60 is arranged for removable and automatic driving engagement with stirring drive apparatus, which is illustrated in FIGS. 11A and 11B, via coupling apparatus, indicated generally by reference numeral 62. The coupling apparatus includes a first engagement portion 120, which is described in detail in FIGS. 9A and 9B and which undergoes reciprocating rotation about an axis 64 and a second engagement portion 66 having a polygonal engagement recess 68. Second engagement portion 66 and recess 68 are arranged symmetrically with respect to axis 64 for rotation thereabout.

The stirring assembly 60 comprises an axle portion 70 including a housing 72 and an internal drive shaft 74. Housing 72 is formed with a perpendicularly extending arm 73, which terminates adjacent a protrusion 75, extending perpendicularly to arm 73.

Internal drive shaft 74 is formed at one end thereof with a polygonal engagement protrusion 76 which is configured to mate with recess 68. At an opposite end thereof, drive shaft 74 is provided with a conical gear 78. Conical gear 78 drivingly engages a corresponding conical gear 80 which is fixedly associated with a first stirrer drive axle 82.

First stirrer drive axle 82 is seated within housing 72 and is provided with a polygonal bore 84 extending therethrough for receiving the shaft 86 of a stirrer 90. First stirrer drive axle 82 is also provided with a drive gear 92, which drivingly engages a first intermediate gear 94 on a first intermediate axle 96.

Intermediate gear 94 drivingly engages a driving gear 98 which is mounted on an axle 100, which optionally can serve as a stirrer drive axle, in which case it is formed with an appropriate bore. Driving gear 98 drivingly engages a second intermediate gear 102 on a second intermediate axle 104. Intermediate gear 102 drivingly engages a driving gear 106 which is mounted on a second stirrer drive axle 108, which along with gears 94, 98 and 102 and axles 96, 100 and 104 is seated within housing 72 and which is provided with a polygonal bore 109, extending therethrough, for receiving the shaft 110 of a stirrer 112.

Figure 8:
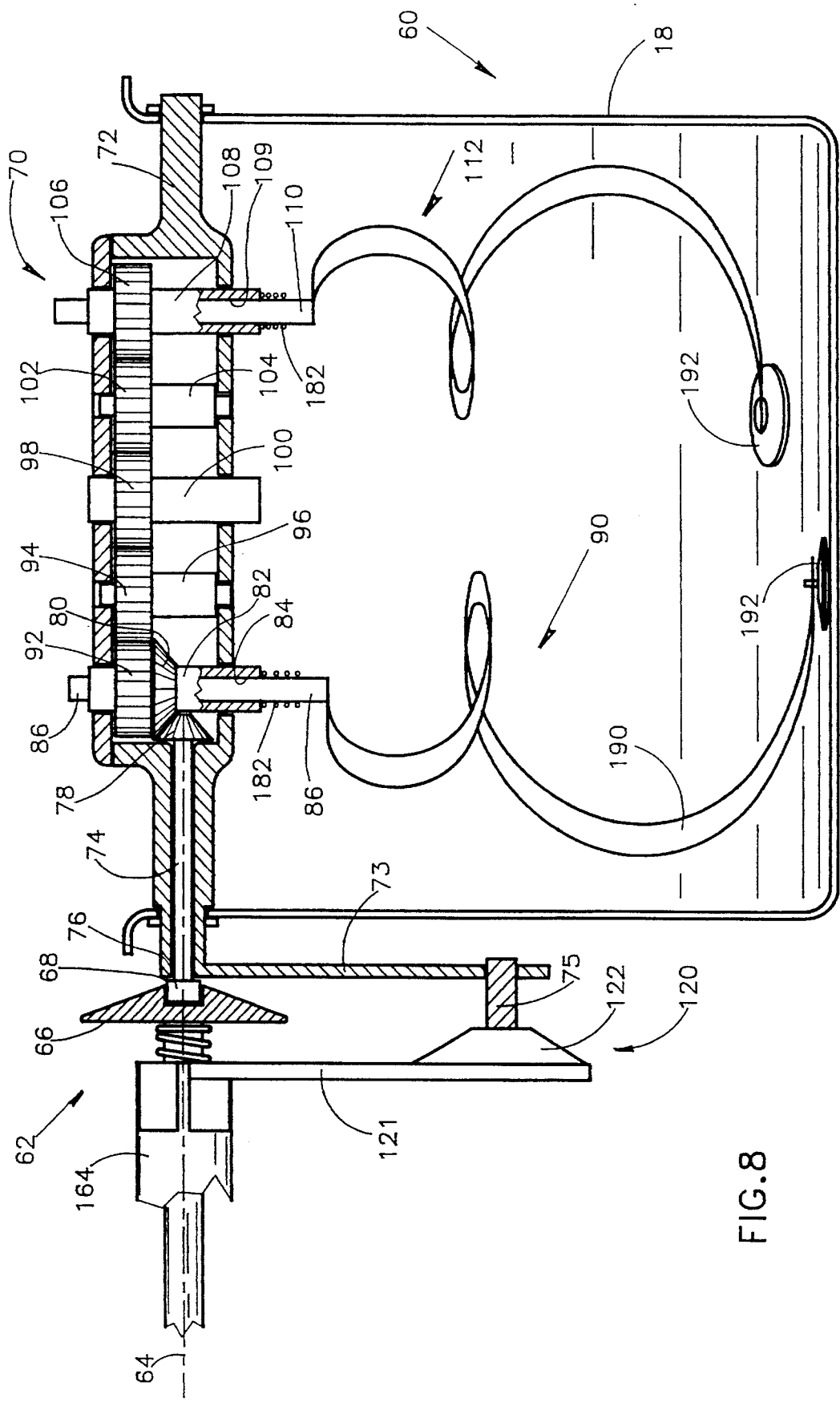
FIG. 8 is a side view illustration of a stirring assembly constructed and operative in accordance with a preferred embodiment of the present invention.

It is appreciated that when two stirrers are employed, as illustrated in FIG. 8, stirring drive axles 82 and 108 are normally employed. When only a single stirrer is employed, it is normally mounted onto stirring drive axle 100.

Reference is now made to FIGS. 11A and 11B which illustrate stirring drive apparatus useful in the present invention. A first motor 128 has its drive shaft 130 coupled, via a gear 131, to a two stage reducing planetary gear assembly 132, whose output drives a shaft 134 which is rotatably mounted into a housing 136.

Engagement portion 66 is spring mounted into shaft 134 for driven rotation together therewith about axis 64 and permitting retraction of the stem 138 of engagement portion 66 into the interior of shaft 134 against the urging of a spring 140.

A second motor 142 has its drive shaft 144 coupled, via a gear 145, to a three stage reducing planetary gear assembly 146, whose output drives a shaft 148 onto which is mounted a rotating drive arm 150. Rotatably mounted onto drive arm 150 is one end of a reciprocating crank 152 whose opposite end is rotatably coupled to arm 154, which is mounted for rotation about axis 64 and is coupled to a sleeve 156 for driving arm 121 in reciprocating rotational motion about axis 64.

As seen in FIG. 8, fixedly mounted to hollow shaft 164 is perpendicularly extending drive arm 121 onto which is fixedly mounted first engagement member 122.

Figure 9A:
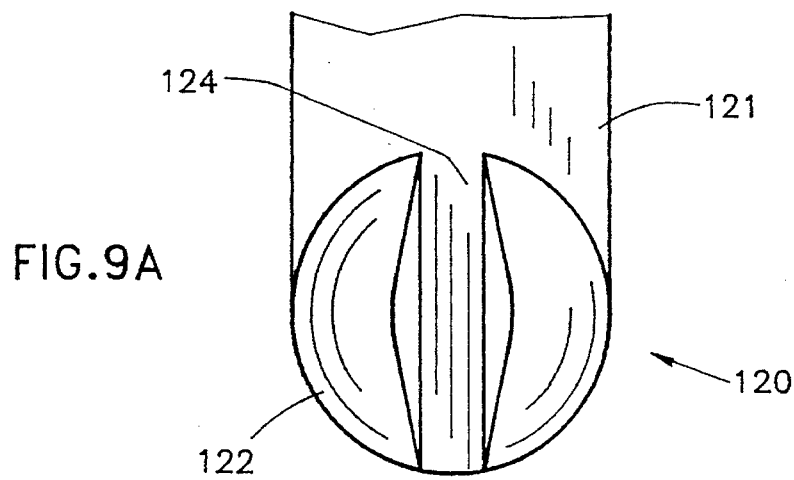
FIGS. 9A and 9B are plan view and edge view illustrations of a stirring coupler constructed and operative in accordance with a preferred embodiment of the present invention.
Figure 9B:
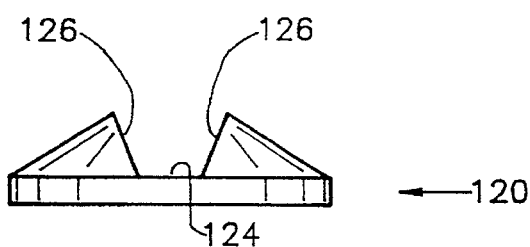

Reference is now made to FIGS. 9A and 9B which illustrate a preferred embodiment of coupler engagement portion 120. The engagement member 122 generally comprises a bifurcated cone whose center is slotted by a slot 124 having inclined side walls 126.

Figures 10A, 10B, 10C:
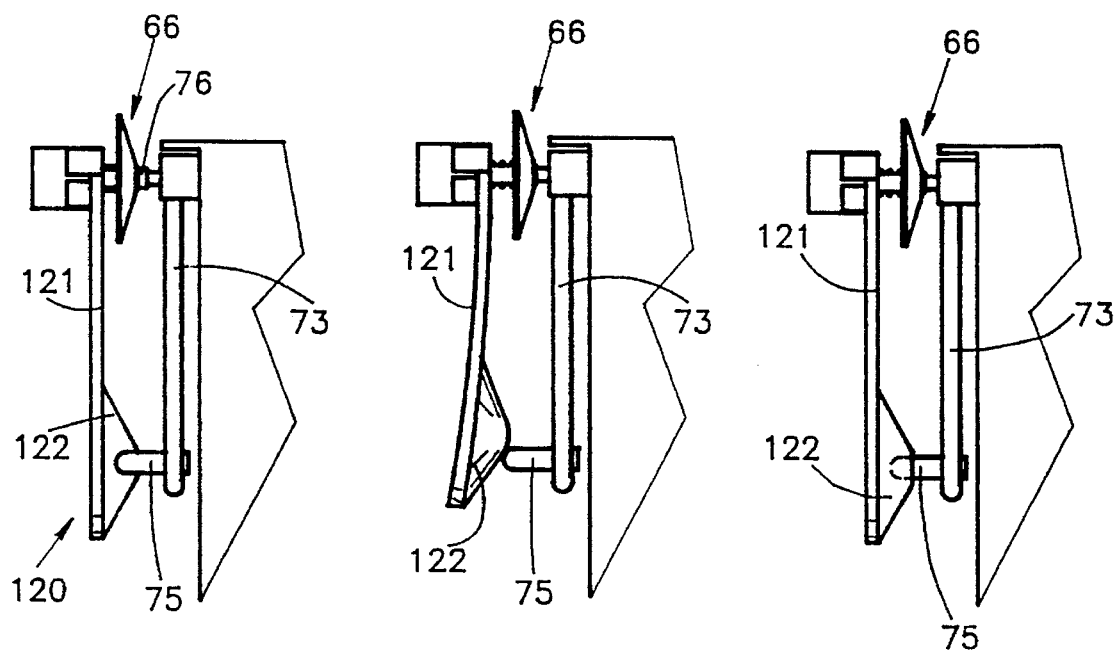
FIGS. 10A, 10B and 10C are three illustrations of stages in the engagement of part of the stirring assembly of FIG. 8 with the coupler of FIGS. 9A and 9B.

Reference is now made to FIGS. 10A, 10B and 10C which illustrate steps in the engagement of protrusion 75 with engagement portion 120. In FIG. 10A, the protrusion 75 is shown alongside the engagement portion 120. In FIG. 10B, the protrusion 75 is shown at the top of engagement member 122, adjacent slot 124 (FIG. 9A), as mounting arm 121 is bent correspondingly. FIG. 10C illustrates seating of the protrusion 75 in slot 124, such that rotation of the hollow shaft 164 about its rotation axis 64, produces rotation of the entire stirring assembly about rotation axis 64.

It is noted that engagement of protrusion 76 in recess 68 and rotation of shaft 164 about axis 64 produce rotation of the individual stirrers 90 and 112 about their individual axes of rotation.

Figure 12:
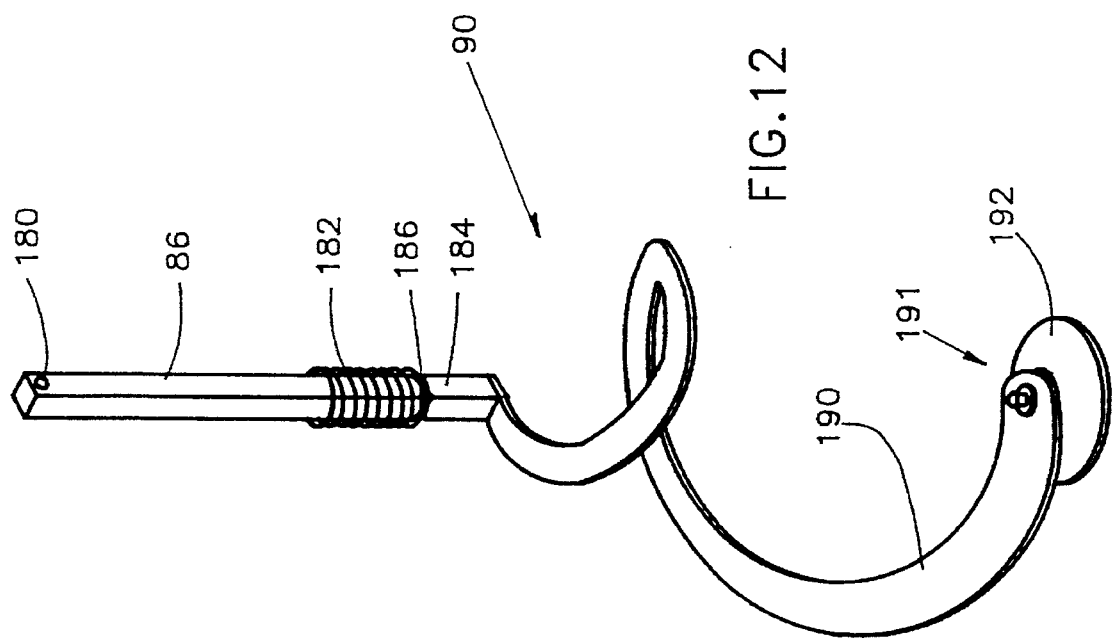
FIG. 12 is a pictorial illustration of a stirrer particularly useful in the apparatus of FIG. 8.

Reference is now made to FIGS. 12–15 which illustrate the structure and operation of stirrers in accordance with a preferred embodiment of the present invention. FIG. 12 illustrates a stirrer 90 having a shaft 86 formed with a retractable retaining protrusion 180 at the top thereof. A coil spring 182 may be disposed about the bottom portion of the shaft 86 to sit on an enlarged shaft portion 184 whose top surface 186 defines a spring seat.

Extending downward from enlarged shaft portion 184 is a generally spiral stirring element 190 of increasing radius. The element 190 is relatively thin and its overall configuration is generally conical.

Disposed at a termination end 191 of the stirring element 190 is a utensil contacting member 192, which rides along the inner surface of a utensil during stirring. It is a particular feature of the invention that the stirrer is arranged to accommodate surfaces at varying angles and distances from the axis of rotation 64 of the stirring assembly.

As seen in FIGS. 13A, 13B and 13C, the utensil contacting member 192 is coupled to the termination end 191 by a connector which allows the utensil contacting member 192 to assume varying orientations relative to the termination end 191.

FIG. 14 illustrates an alternative embodiment of utensil contacting member 193 which definers a ball socket 195. Here the termination end 197 of the stirrer is formed with a ball joint protrusion 199 which is arranged for rotatable seating in socket 195.

As seen in FIG. 8, when considering the two different rotational orientations shown for stirrers 90 and 112, it is seen that when the overall distance between the utensil contacting member 192 and the axis 64 varies within given limits, the shaft 86 of the stirrer rises or lowers relative to the axis 64 in bores 84 and 109 respectively, against the urging of springs 182, if springs are provided. It is noted that although the two stirrers 90 and 112 are shown in FIG. 8 to have different rotational orientations, for the purposes of explanation, normally they operate in synchronization and both have the same orientation.

Reference is now made to FIG. 15, which illustrates the pattern of coverage of an inner surface of a utensil 18. It is seen that the rotation of the utensil contacting members covers generally the entire surface of a major portion of the utensil, which normally is heated and thus prevents sticking and burning of food in engagement therewith during cooking.

It will be appreciated by persons skilled in the art that the present invention is not limited by what has been particularly shown and described hereinabove. It is appreciated that any combination of the features shown in the drawings also may lie within the scope of the invention. The scope of the present invention is defined only by the claims which follow:

We claim:

1. Stirring apparatus comprising:

a stirrer having an attachment end and a termination end;

a stirrer mount for mounting said stirrer at said attachment end and driving said stirrer in motion in operative association with a utensil defining a utensil surface; and a utensil contacting member mounted onto the termination end of said stirrer and being orientatable with respect thereto so as to correspond to the configuration of the utensil surface in engagement therewith and wherein said utensil contacting member is pivotably mounted onto the termination end of said stirrer by means of a ball joint which provides multiple degrees of freedom between said utensil contacting member and said termination end.

2. Apparatus according to claim 1 and wherein said utensil contacting member has a disc-like configuration.

3. Apparatus according to claim 2 wherein said stirrer mount is operative to rotate said stirrer about a stirrer rotation axis and also including a stirrer mount driver operative to rotate said stirrer mount about a stirrer mount rotation axis perpendicular to said stirrer rotation axis.

4. Apparatus according to claim 1 wherein said stirrer mount is operative to rotate said stirrer about a stirrer rotation axis and also including a stirrer mount driver operative to rotate said stirrer mount about a stirrer mount rotation axis perpendicular to said stirrer rotation axis.

5. Stirring apparatus comprising:

a stirrer having an attachment end and a termination end;

a stirrer mount for mounting said stirrer at said attachment end and driving said stirrer in motion in operative association with a utensil defining a utensil surface; and a utensil contacting member mounted onto the termination end of said stirrer and being orientatable with respect thereto so as to correspond to the configuration of the utensil surface in engagement therewith, wherein said stirrer mount is operative to rotate said stirrer about a stirrer rotation axis and also including a stirrer mount driver operative to rotate said stirrer mount about a stirrer mount rotation axis perpendicular to said stirrer rotation axis.

6. Apparatus according to claim 5 wherein said utensil contacting member is pivotably mounted onto the termination end of said stirrer.

7. Apparatus according to claim 6 wherein said utensil contacting member has a disc-like configuration.

8. Apparatus according to claim 5 wherein said utensil contacting member has a disc-like configuration.

\* \* \* \* \*